United States Patent
Perina

(10) Patent No.: US 10,100,548 B2
(45) Date of Patent: Oct. 16, 2018

(54) BASE ANGLE ATTACHMENT ASSEMBLIES

(71) Applicant: VALMONT INDUSTRIES, INC., Omaha, NE (US)

(72) Inventor: Mark Perina, Omaha, NE (US)

(73) Assignee: VALMONT INDUSTRIES, INC., Omaha, NE (US)

( * ) Notice: Subject to any disclaimer, the term of this patent is extended or adjusted under 35 U.S.C. 154(b) by 0 days.

(21) Appl. No.: 14/432,737

(22) PCT Filed: Oct. 1, 2013

(86) PCT No.: PCT/US2013/062888
§ 371 (c)(1),
(2) Date: Mar. 31, 2015

(87) PCT Pub. No.: WO2014/055534
PCT Pub. Date: Apr. 10, 2014

(65) Prior Publication Data
US 2015/0252581 A1     Sep. 10, 2015

Related U.S. Application Data

(60) Provisional application No. 61/708,628, filed on Oct. 1, 2012.

(51) Int. Cl.
| | |
|---|---|
| *E02D 27/50* | (2006.01) |
| *E04H 12/22* | (2006.01) |
| *E02D 27/00* | (2006.01) |
| *E02D 27/42* | (2006.01) |
| *F16M 13/02* | (2006.01) |

(52) U.S. Cl.
CPC ............. *E04H 12/22* (2013.01); *E02D 27/00* (2013.01); *E02D 27/42* (2013.01); *F16M 13/02* (2013.01)

(58) Field of Classification Search
CPC ................................. E04H 12/22; E02D 27/42
See application file for complete search history.

(56) References Cited

U.S. PATENT DOCUMENTS

| | | | | |
|---|---|---|---|---|
| 4,665,672 A | * | 5/1987 | Commins | ............. E04B 1/0007 403/190 |
| 5,437,519 A | * | 8/1995 | Bullivant | ................ E02D 27/42 405/239 |
| 5,505,033 A | * | 4/1996 | Matsuo | ............... E04H 12/2261 52/169.9 |
| 5,678,382 A | * | 10/1997 | Naito | ...................... E02D 27/42 52/295 |

(Continued)

*Primary Examiner* — Gisele D Ford
(74) *Attorney, Agent, or Firm* — Milligan PC LLO

(57) ABSTRACT

A base angle attachment assembly includes a connector for coupling to a base and a pole supported by the base. The connector has a first connecting member and a second connecting member extending generally perpendicularly with respect to the first connecting member. The first connecting member of the connector defines an aperture for receiving a fastener configured to couple the connector with the base. The second connecting member of the connector defines apertures for receiving fasteners configured to couple the connector with the pole. The base angle attachment assembly also includes a containment assembly configured for insertion into an interior cavity of the pole for receiving and aligning the fasteners with the apertures defined in the second connecting member of the connector.

1 Claim, 50 Drawing Sheets

(56) References Cited

U.S. PATENT DOCUMENTS

| | | | | |
|---|---|---|---|---|
| 7,004,683 B1* | 2/2006 | Rupiper | ............ | E02D 5/56 405/229 |
| 8,161,698 B2* | 4/2012 | Migliore | ............ | E02D 27/42 52/169.9 |
| 9,016,005 B2* | 4/2015 | Garcia Maestre | ............ | E02D 27/42 52/126.1 |
| 2003/0183740 A1* | 10/2003 | Knapp | ............ | E01F 9/0182 248/548 |
| 2007/0251187 A1* | 11/2007 | Schiffer | ............ | E02D 27/42 52/741.14 |
| 2008/0155907 A1* | 7/2008 | Wobben | ............ | E02D 27/42 52/169.13 |
| 2008/0302038 A1* | 12/2008 | Wobben | ............ | E02D 27/42 52/296 |
| 2009/0044482 A1* | 2/2009 | Tooman | ............ | E02D 27/42 52/699 |
| 2009/0217607 A1* | 9/2009 | Stark | ............ | E02D 27/42 52/298 |
| 2009/0266016 A1* | 10/2009 | Kraft | ............ | E02D 27/42 52/296 |
| 2011/0131899 A1* | 6/2011 | Voss | ............ | E02D 27/42 52/173.1 |
| 2011/0138707 A1* | 6/2011 | Bagepalli | ............ | E02D 27/42 52/173.1 |
| 2011/0278850 A1* | 11/2011 | Murata | ............ | E02D 27/42 290/55 |
| 2012/0070233 A1* | 3/2012 | Wang | ............ | E02D 27/42 405/232 |
| 2013/0036679 A1* | 2/2013 | Nyce | ............ | E04H 12/2261 52/105 |
| 2013/0068924 A1* | 3/2013 | Ollgaard | ............ | E02D 27/42 249/34 |
| 2013/0199117 A1* | 8/2013 | Tuominen | ............ | E02D 27/42 52/297 |
| 2014/0215941 A1* | 8/2014 | Brown | ............ | E02D 27/42 52/295 |
| 2014/0318033 A1* | 10/2014 | Coordes | ............ | E02D 27/42 52/40 |

* cited by examiner

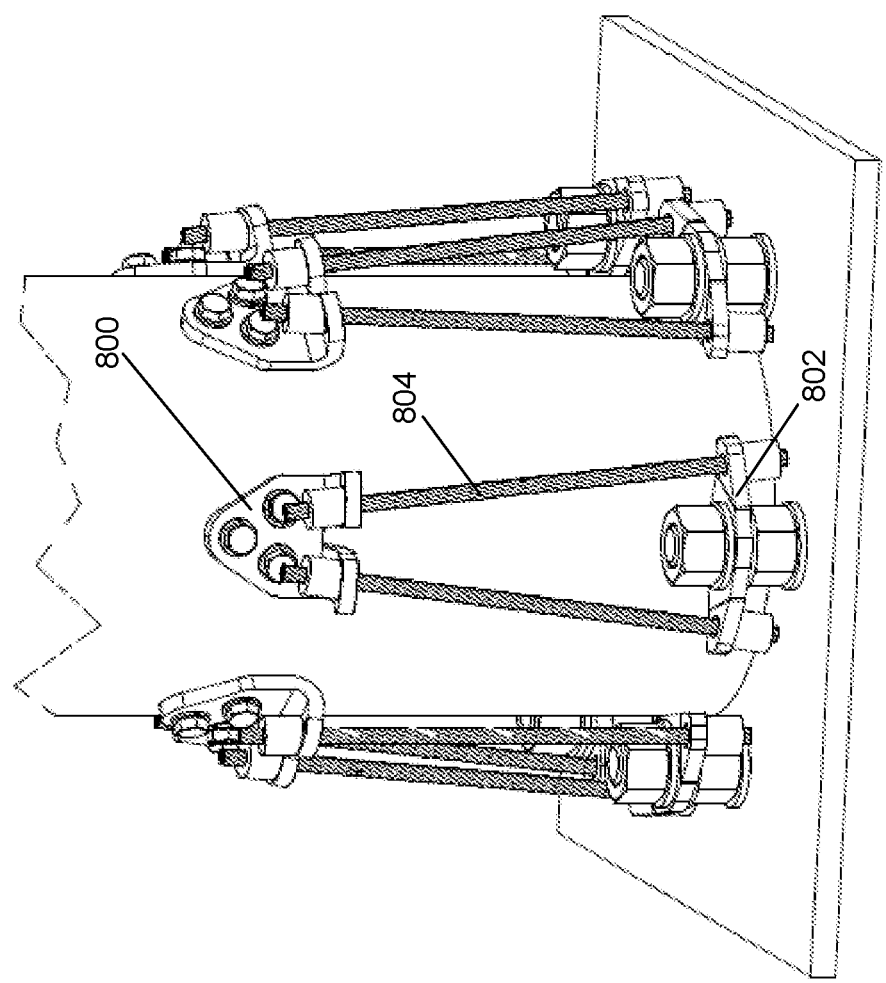

BASE ANGLE ATTACHMENT ASSEMBLIES

CLAIM OF PRIORITY

This application claims the benefit of priority to PCT/US2013/062888, filed Oct. 1, 2013 and U.S. Patent Application No. 61/708,628, filed Oct. 1, 2012, entitled BASE ANGLE ATTACHMENT ASSEMBLIES", which is incorporated herein by reference in its entirety.

BACKGROUND

Poles anchored to the ground can be used to support overhead equipment. For example, a utility pole can support overhead power lines and public utilities, such as cable, fiber optic cable, transformers, street lights, and so forth. Utility poles generally include telephone poles, power poles, telegraph poles, and so on.

SUMMARY

A base angle attachment assembly includes a connector for coupling to a base and a pole supported by the base. The connector has a first connecting member and a second connecting member extending generally perpendicularly with respect to the first connecting member. The first connecting member of the connector defines an aperture for receiving a fastener configured to couple the connector with the base. The second connecting member of the connector defines apertures for receiving fasteners configured to couple the connector with the pole. The base angle attachment assembly also includes a containment assembly configured for insertion into an interior cavity of the pole for receiving and aligning the fasteners with the apertures defined in the second connecting member of the connector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION

FIG. 1A is a perspective view illustrating base angle attachment assemblies including a lug connector for coupling to a base and a pole supported by the base, the pole having a polygonal cross-section, where a first connecting member of the lug connector is coupled with an anchor bolt extending from the base, a second connecting member of the lug connector is coupled with four bolts inserted from an interior cavity of the pole and extending through the second connecting member of the lug connector, and a containment assembly is positioned in the interior cavity of the pole to align the four bolts with the second connecting member of the lug connector in accordance with an example implementation of the present disclosure.

Figure 2A:
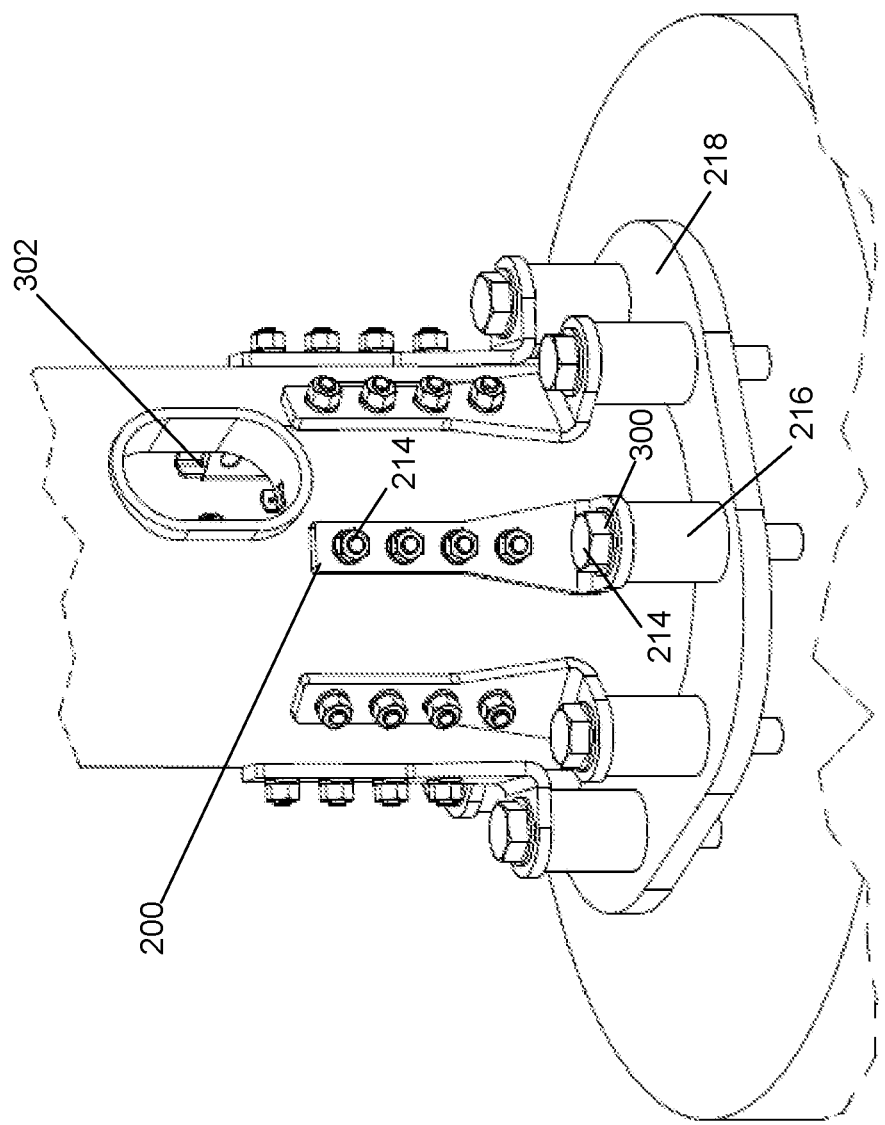

FIG. 2A is a perspective view illustrating base angle attachment assemblies including a lug connector for coupling to a base and a pole supported by the base, the pole having a polygonal cross-section, where a first connecting member of the lug connector is coupled with an anchor bolt extending from the base, a second connecting member of the lug connector is coupled with four bolts inserted from an interior cavity of the pole and extending through the second connecting member of the lug connector, a containment assembly is positioned in the interior cavity of the pole to align the four bolts with the second connecting member of the lug connector, the anchor bolt is connected to the lug connector using a coupling nut and an additional bolt, and a standoff column is disposed between the lug connector and the base in accordance with an example implementation of the present disclosure.

Figure 2B:
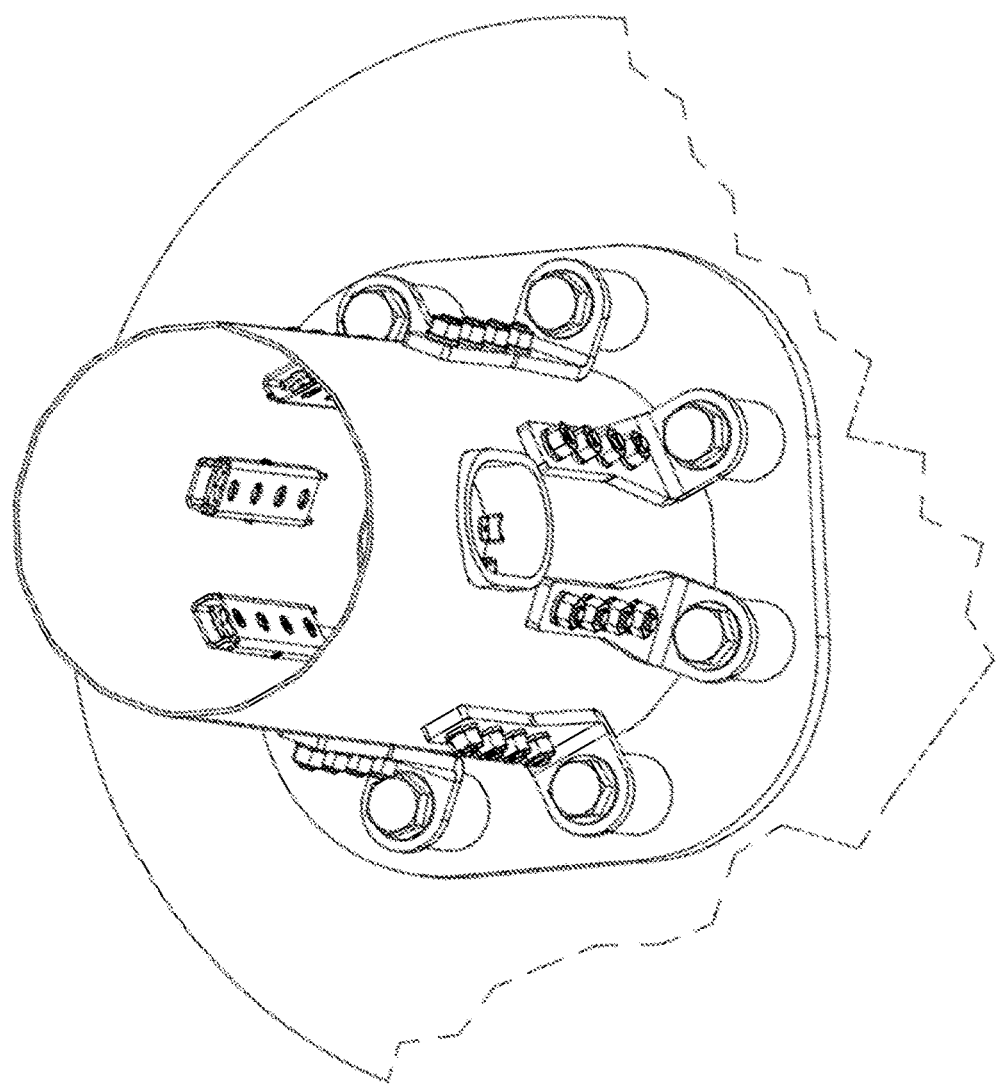

FIG. 2B is another perspective view of the base angle attachment assemblies coupled to the base and the pole illustrated in FIG. 2A.

Figure 2C:
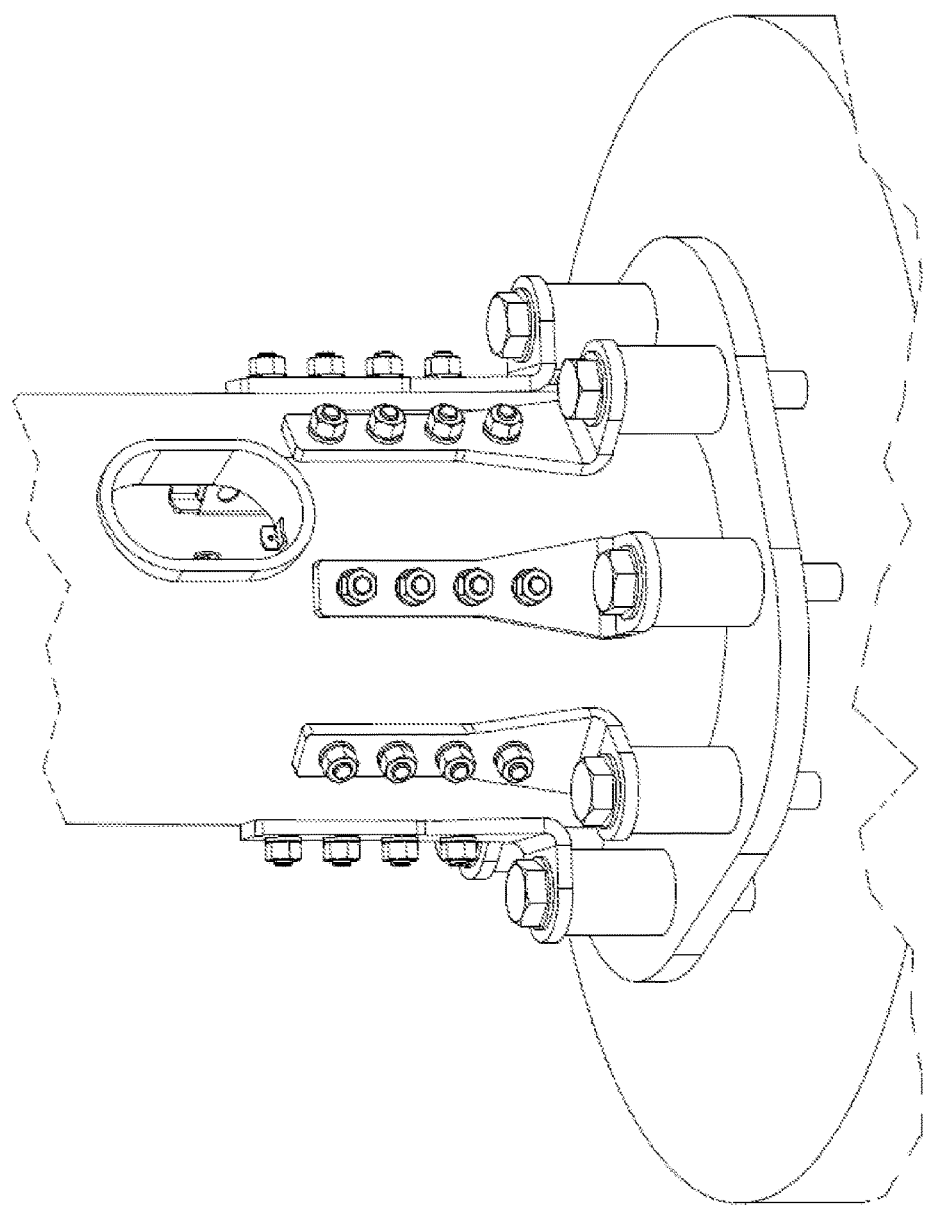

FIG. 2C is a further perspective view of the base angle attachment assemblies coupled to the base and the pole illustrated in FIG. 2A.

Figure 3A:
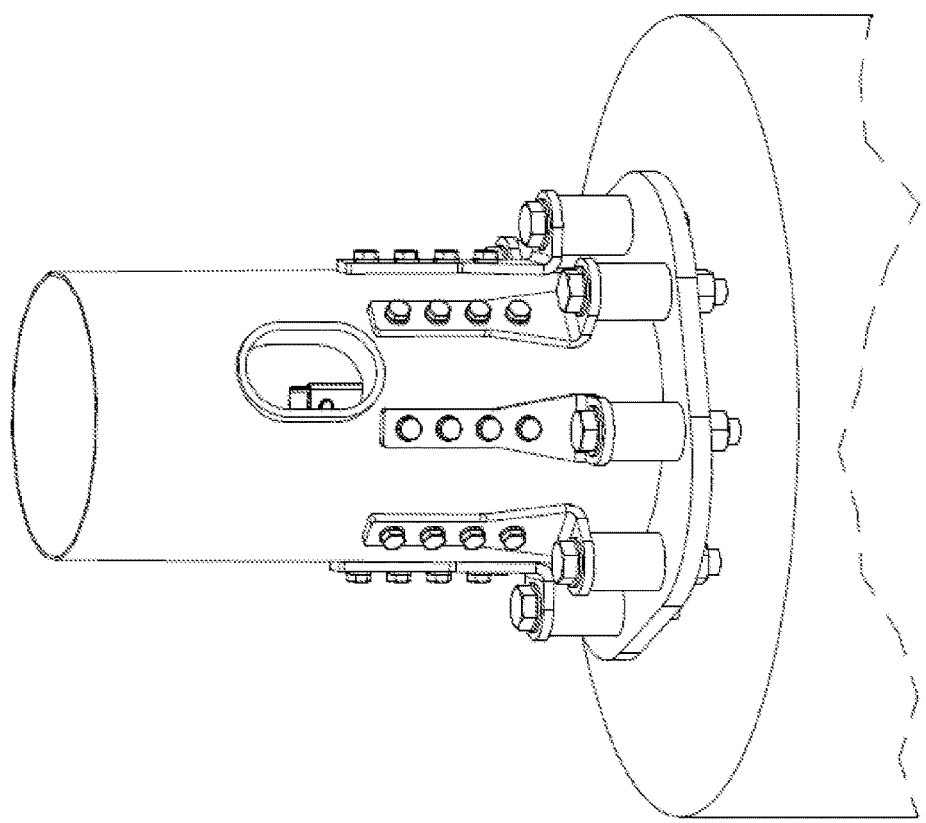

FIG. 3A is a perspective view illustrating base angle attachment assemblies including a lug connector for coupling to a base and a pole supported by the base, the pole having a polygonal cross-section, where a first connecting member of the lug connector is coupled with an anchor bolt extending from the base, a second connecting member of the lug connector is coupled with four bolts extending through the second connecting member of the lug connector and into an interior cavity of the pole, a containment assembly is positioned in the interior cavity of the pole to align four nuts with the four bolts, the anchor bolt is connected to the lug connector using a coupling nut and an additional bolt, and a standoff column is disposed between the lug connector and the base in accordance with an example implementation of the present disclosure.

Figure 3B:
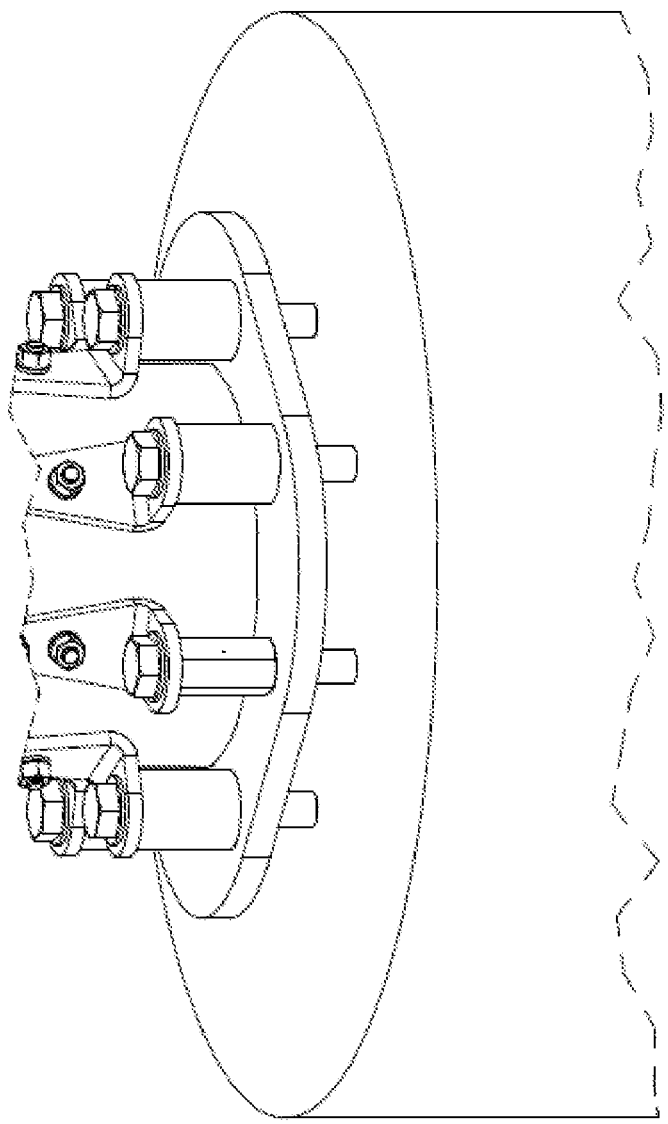

FIG. 3B is a partial perspective view of the base angle attachment assemblies coupled to the base and the pole illustrated in FIG. 3A where a standoff column is removed from one of the base angle attachment assemblies for illustration purposes.

Figure 3C:
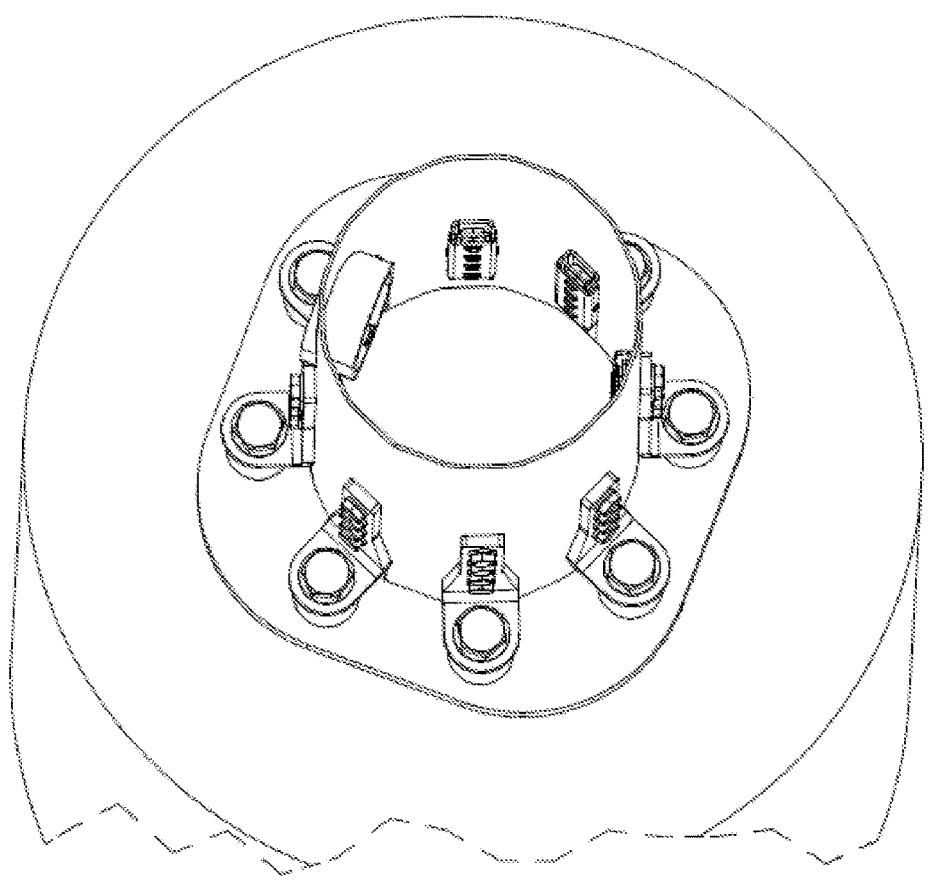

FIG. 3C is another perspective view of the base angle attachment assemblies coupled to the base and the pole illustrated in FIG. 3A.

Figure 3D:
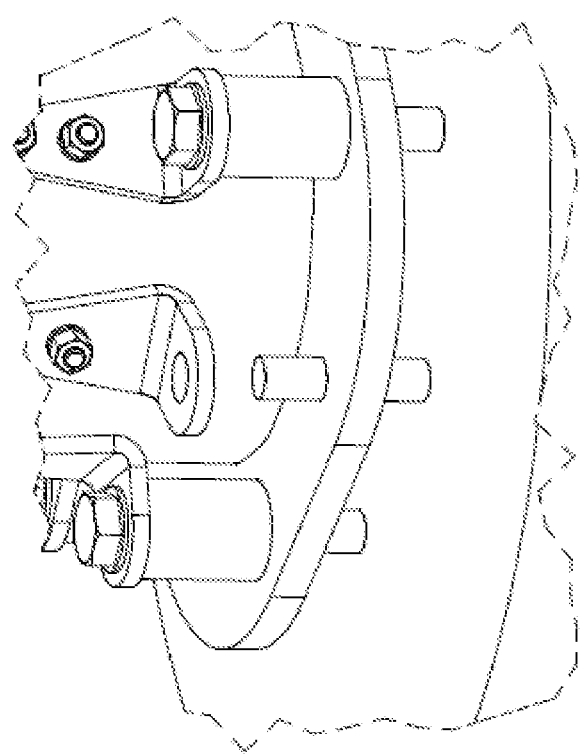

FIG. 3D is a partial perspective view of the base angle attachment assemblies coupled to the base and the pole illustrated in FIG. 3A where a standoff column, a coupling nut, and an additional bolt are removed from one of the base angle attachment assemblies for illustration purposes.

Figure 3E:
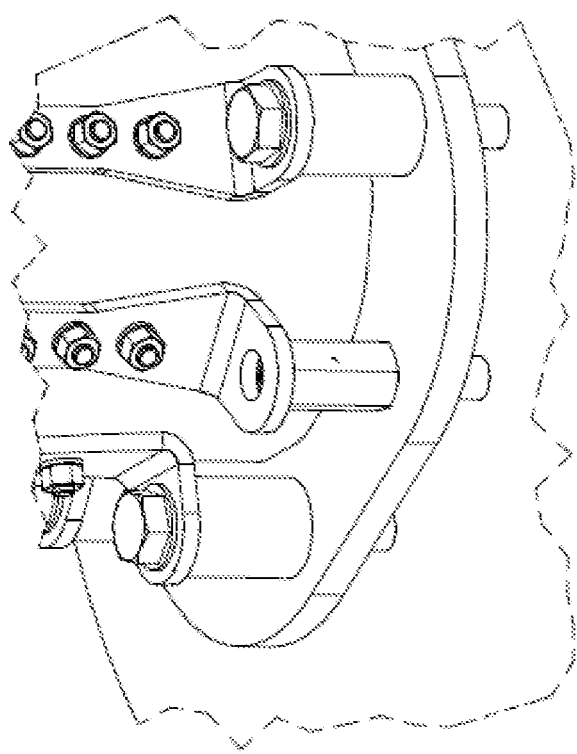

FIG. 3E is a partial perspective view of the base angle attachment assemblies coupled to the base and the pole illustrated in FIG. 3A where a standoff column and an additional bolt are removed from one of the base angle attachment assemblies for illustration purposes.

Figure 3F:
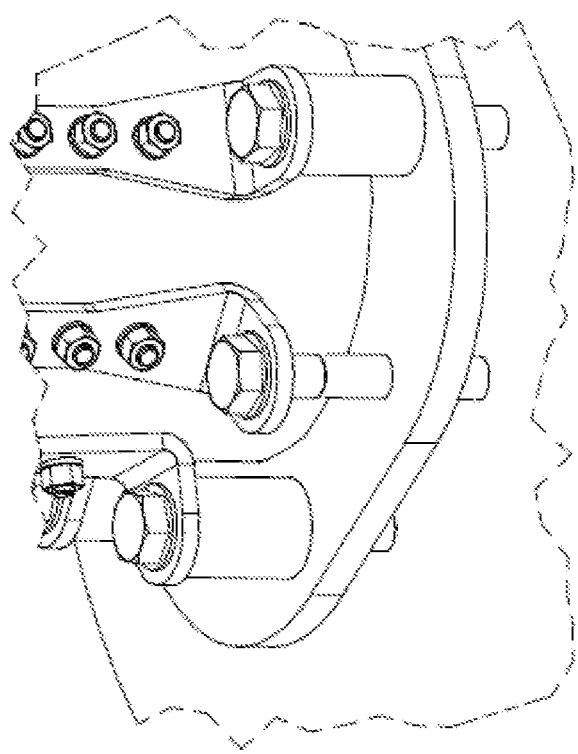

FIG. 3F is a partial perspective view of the base angle attachment assemblies coupled to the base and the pole illustrated in FIG. 3A, where a standoff column and a coupling nut are removed from one of the base angle attachment assemblies for illustration purposes.

Figure 3G:
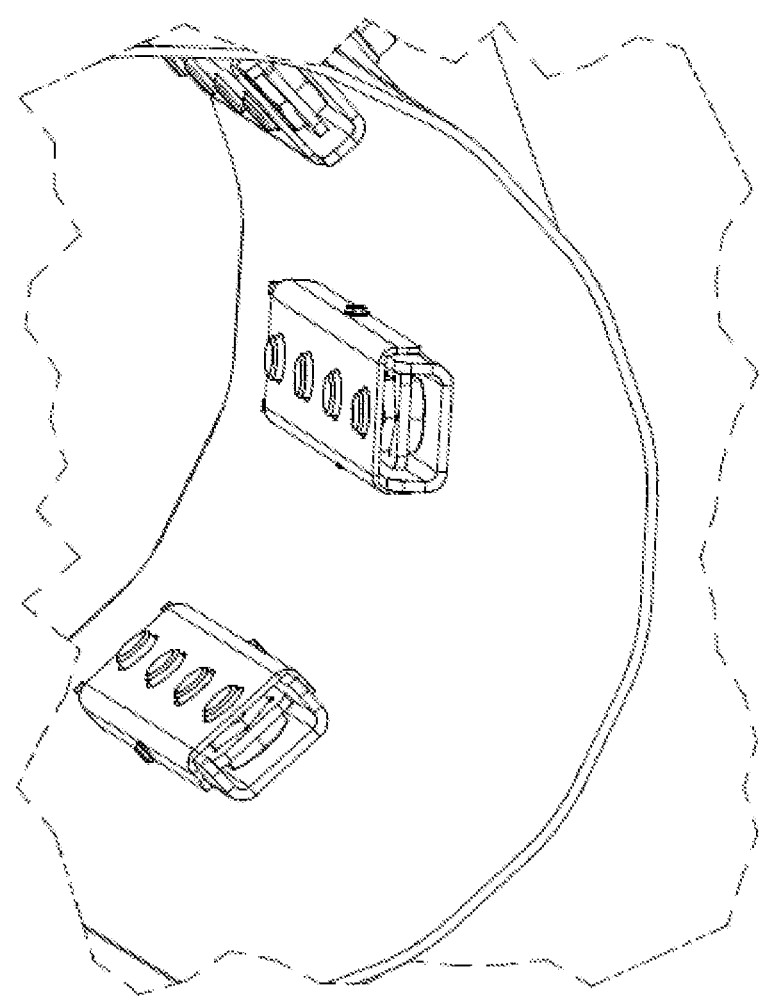

FIG. 3G is another perspective view of the base angle attachment assemblies coupled to the base and the pole illustrated in FIG. 3A.

Figure 3H:
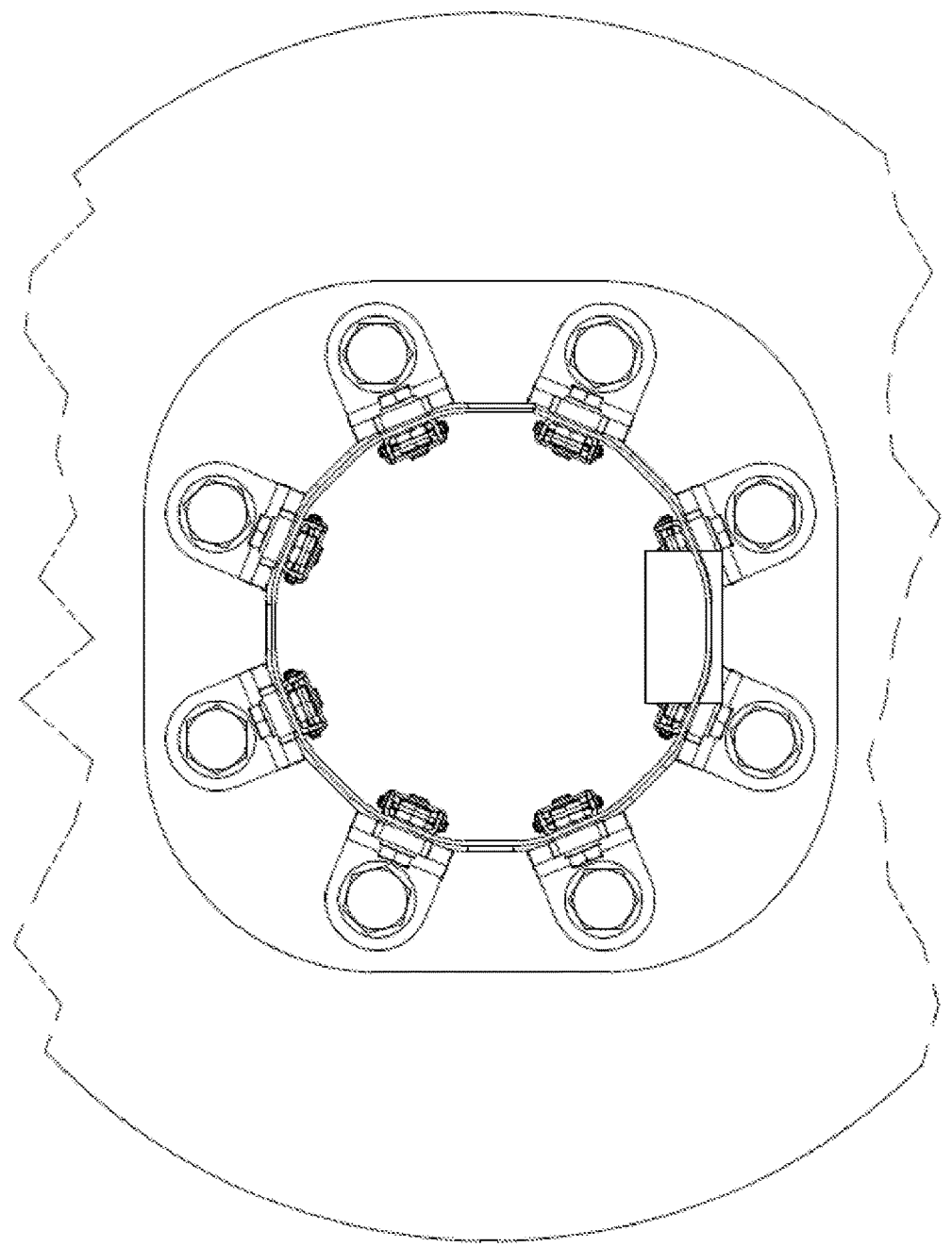

FIG. 3H is a plan view of the base angle attachment assemblies coupled to the base and the pole illustrated in FIG. 3A.

Figure 4A:
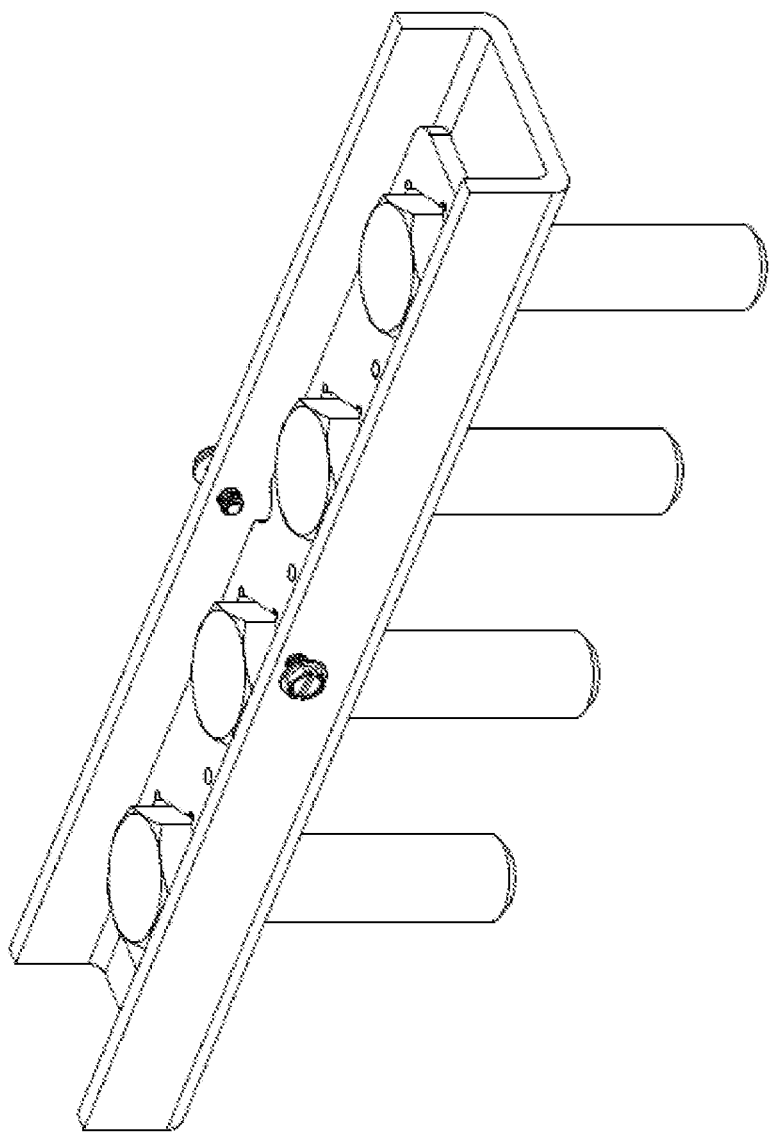

FIG. 4A is a perspective view illustrating a containment assembly for retaining four bolts in accordance with example implementations of the present disclosure.

Figure 4B:
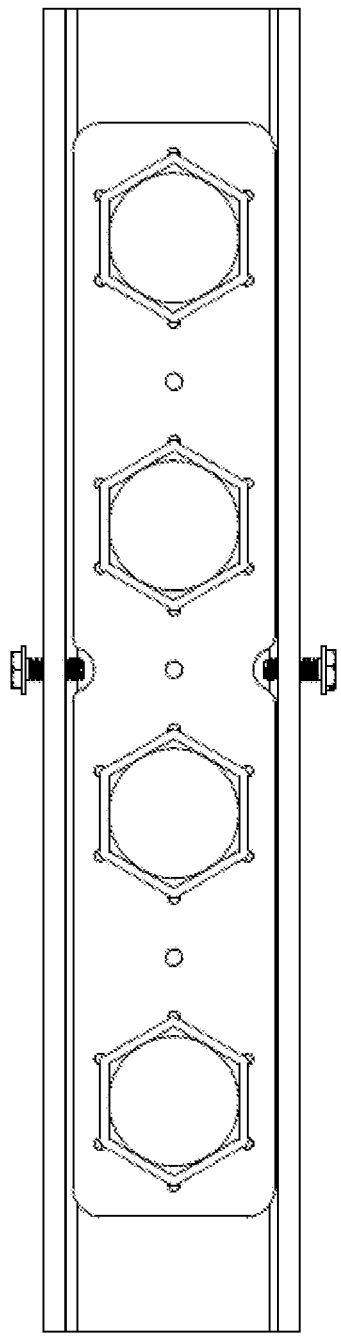

FIG. 4B is a plan view of the containment assembly illustrated in FIG. 4A.

Figure 4C:
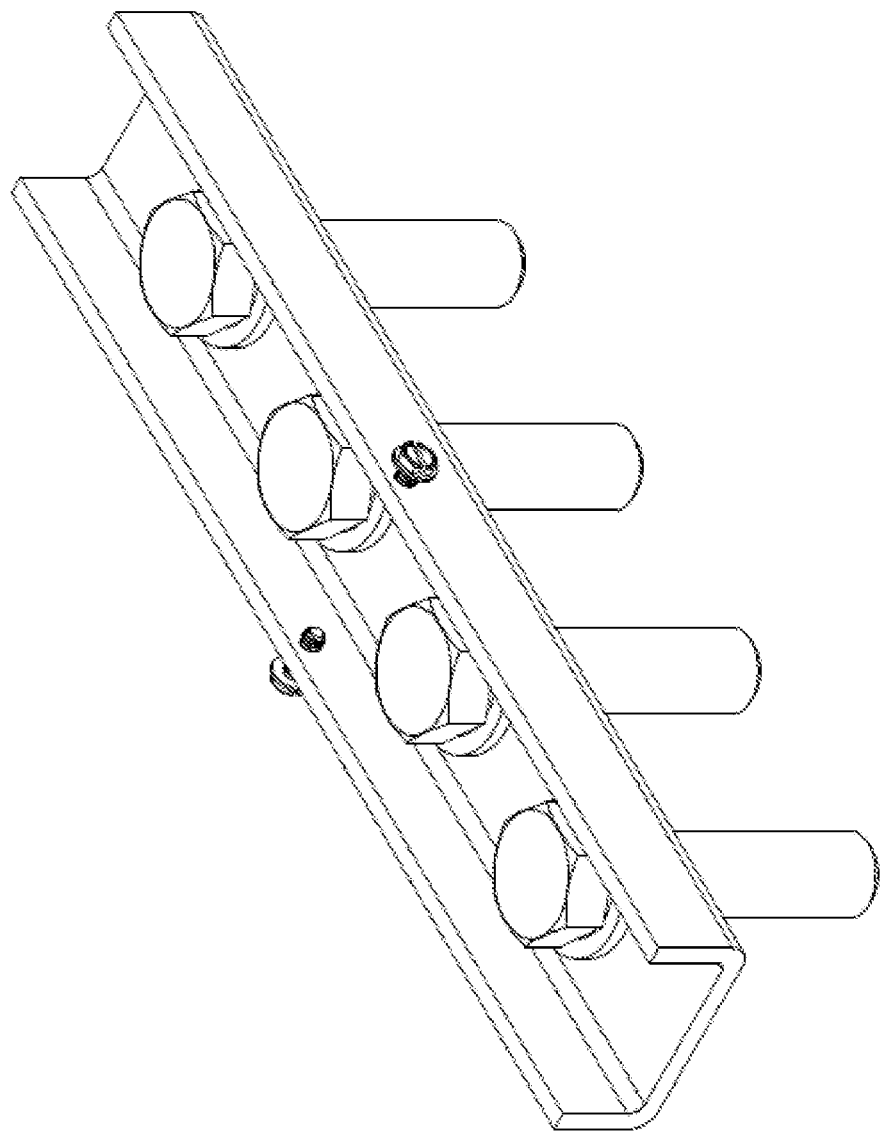

FIG. 4C is a perspective view of the containment assembly illustrated in FIG. 4A, where a cover plate is removed from the containment assembly for illustration purposes.

Figure 4D:
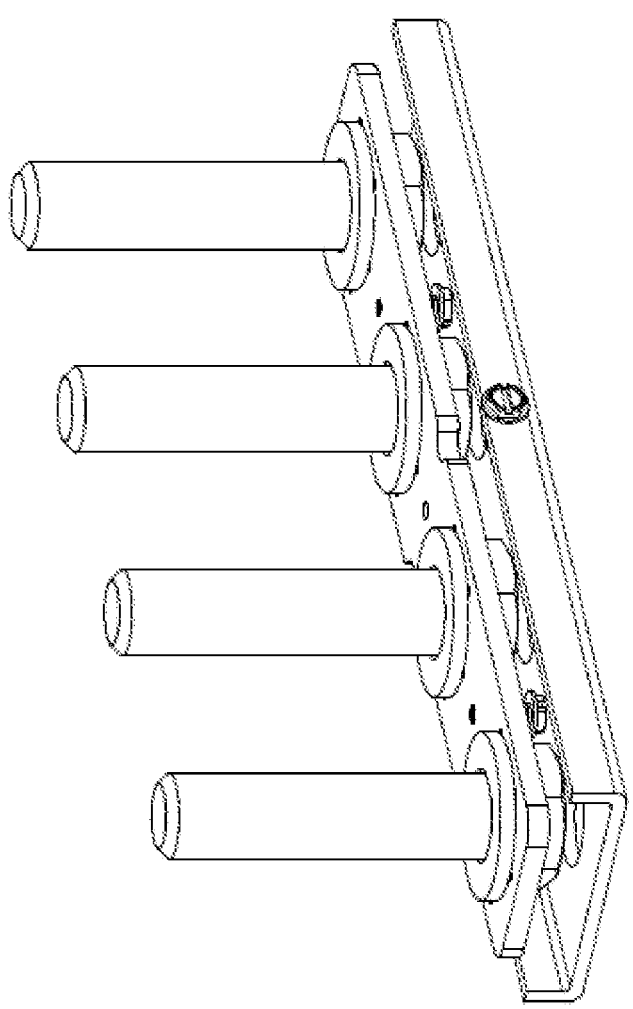

FIG. 4D is a perspective view of the containment assembly illustrated in FIG. 4A, where a splice plate is removed from the containment assembly for illustration purposes.

Figure 4E:
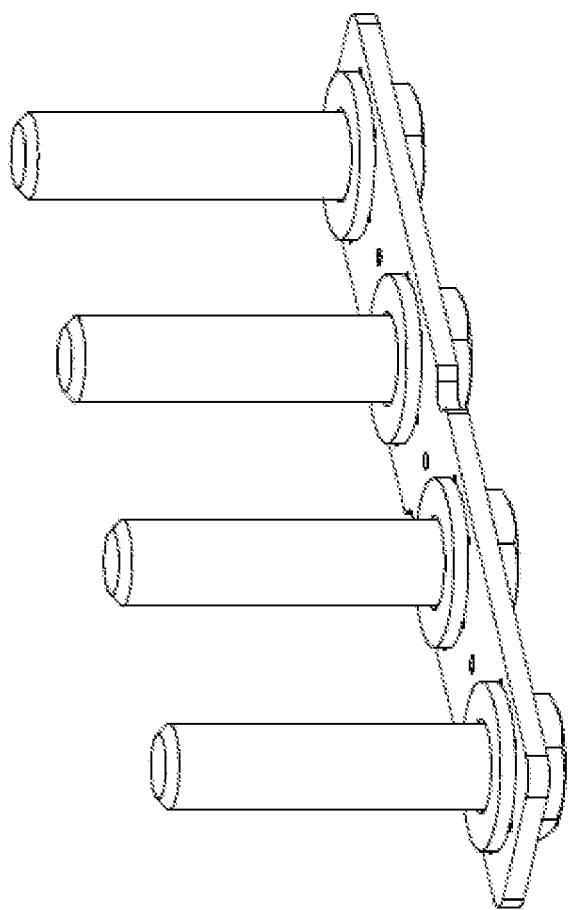

FIG. 4E is a perspective view of the containment assembly illustrated in FIG. 4A, where the cover plate and the splice plate are removed from the containment assembly for illustration purposes.

Figure 4F:
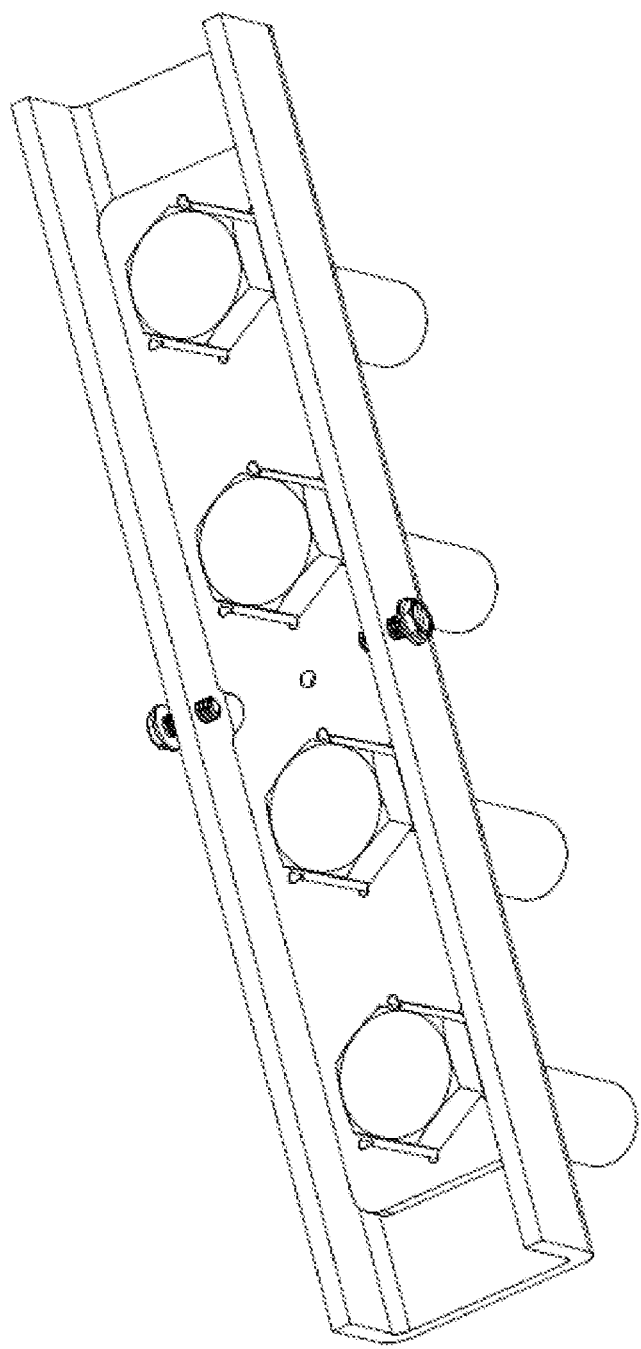

FIG. 4F is another perspective view of the containment assembly illustrated in FIG. 4A.

Figure 5A:
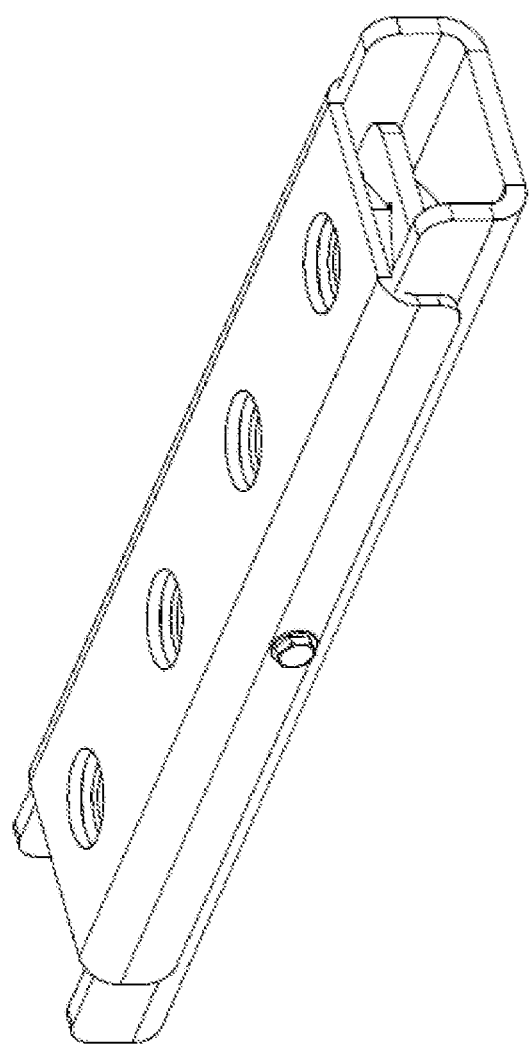

FIG. 5A is a perspective view illustrating a containment assembly for retaining four nuts in accordance with example implementations of the present disclosure.

Figure 5B:
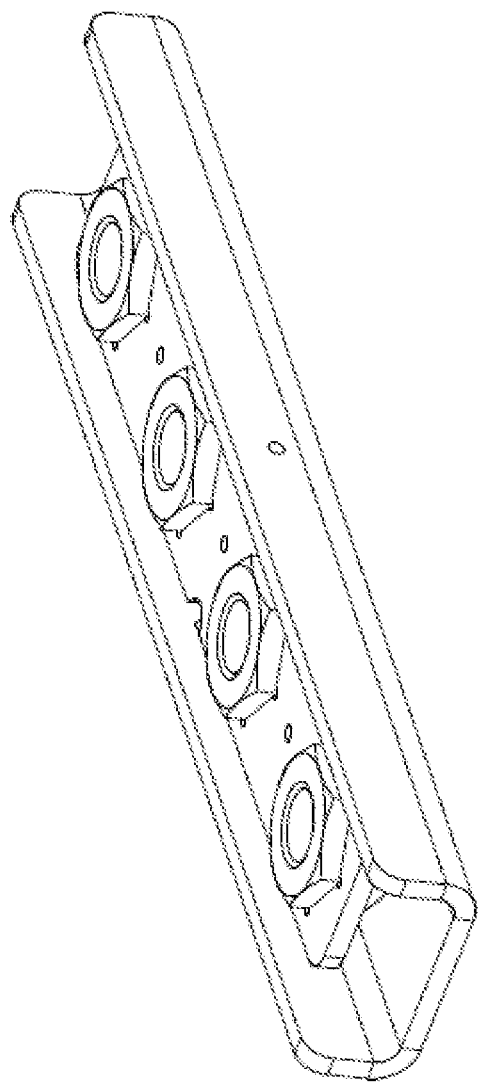

FIG. 5B is a perspective view of the containment assembly illustrated in FIG. 5A, where a cover plate is removed from the containment assembly for illustration purposes.

Figure 5C:
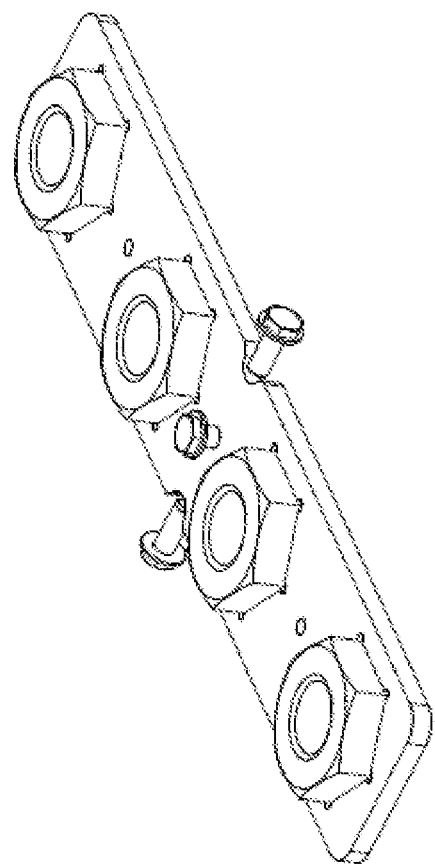

FIG. 5C is a perspective view of the containment assembly illustrated in FIG. 5A, where the cover plate and a splice plate are removed from the containment assembly for illustration purposes.

Figure 5D:
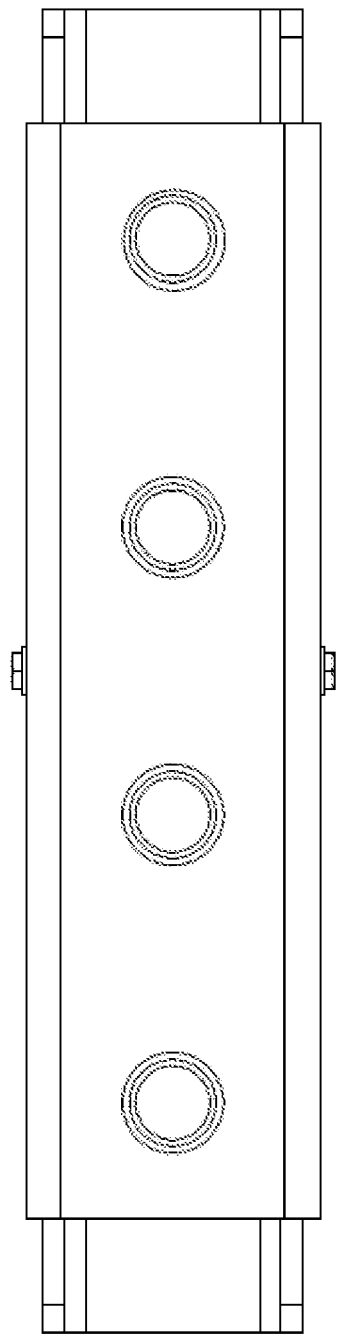

FIG. 5D is a plan view of the containment assembly illustrated in FIG. 5A.

Figure 6:
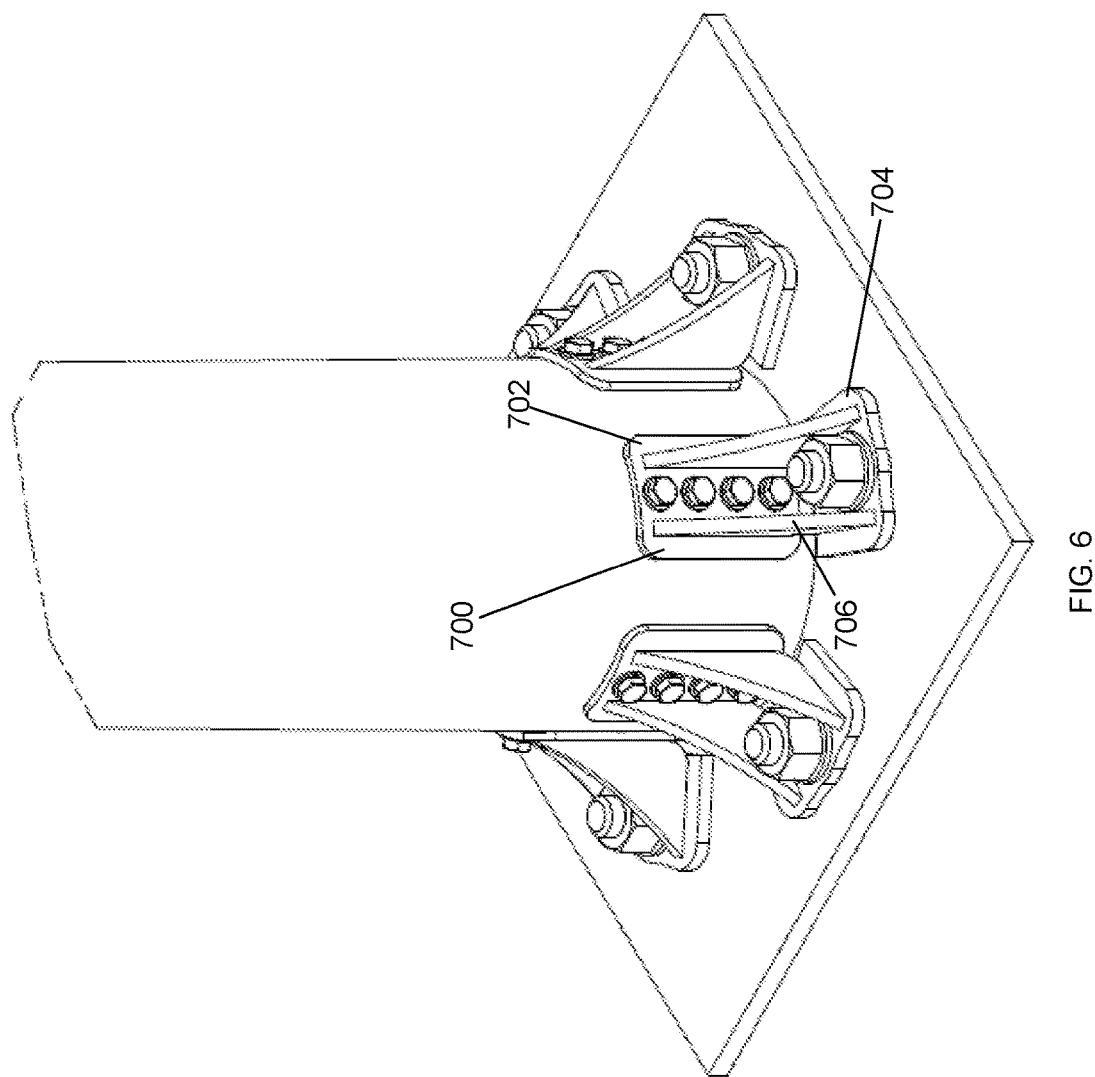

FIG. 6 is a perspective view illustrating base angle attachment assemblies including a shoe connector for coupling to a base and a pole supported by the base, the pole having a round cross-section, where a first connecting member of the shoe connector is coupled with an anchor bolt extending from the base, and a second connecting member of the shoe connector is coupled with four bolts extending through the second connecting member of the shoe connector and into an interior cavity of the pole.

Figure 7:
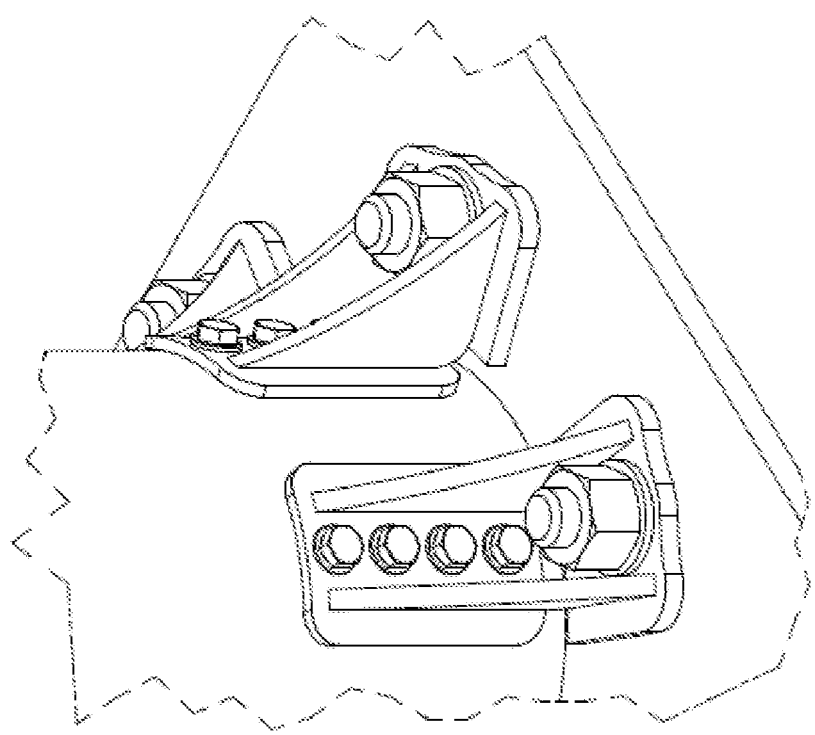

FIG. 7 is another perspective view of the base angle attachment assemblies coupled to the base and the pole illustrated in FIG. 6.

FIG. 8A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with three bolts extending through the lug connecting member of the connector and into an interior cavity of the pole, and the first connecting member is connected to the lug connecting member using two pre-stressing strands.

Figure 8B:
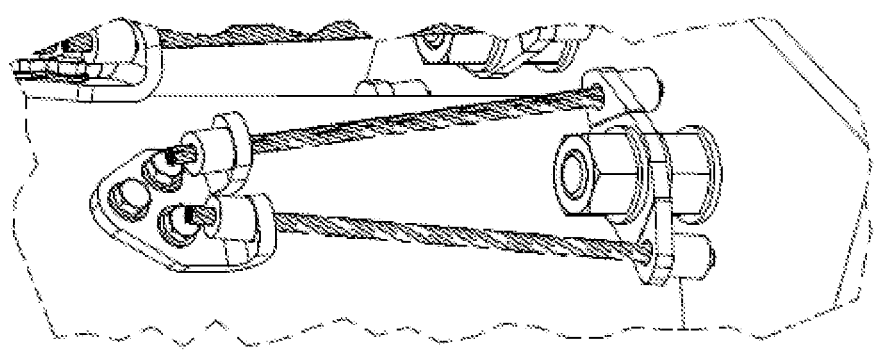

FIG. 8B is another perspective view of the base angle attachment assemblies coupled to the base and the pole illustrated in FIG. 8A.

Figure 9A:
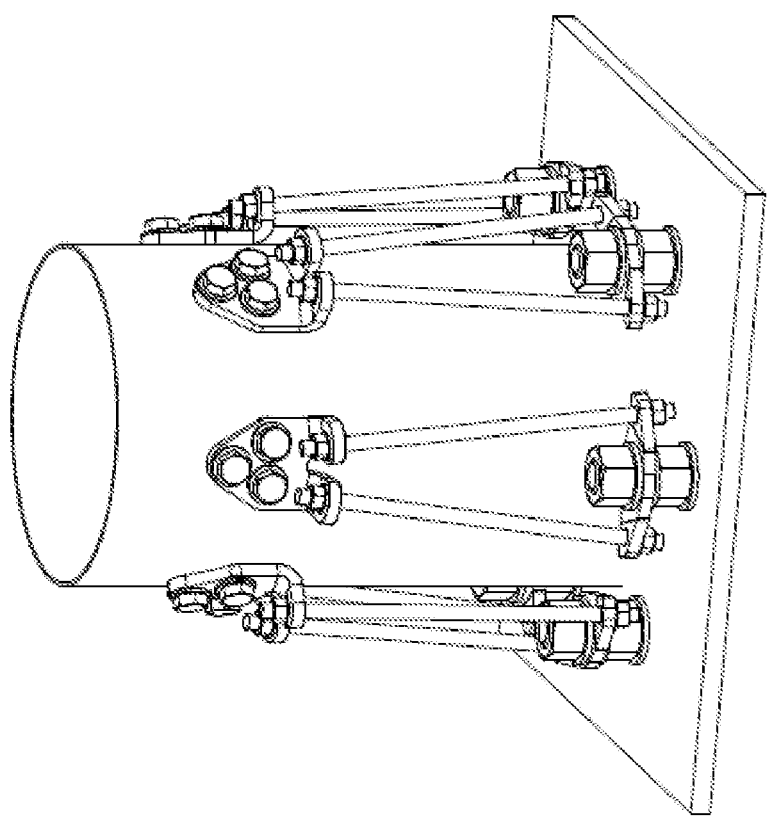

FIG. 9A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with three bolts extending through the lug connecting member of the connector and into an interior cavity of the pole, and the first connecting member is connected to the lug connecting member using two threaded rods with nuts.

Figure 9B:
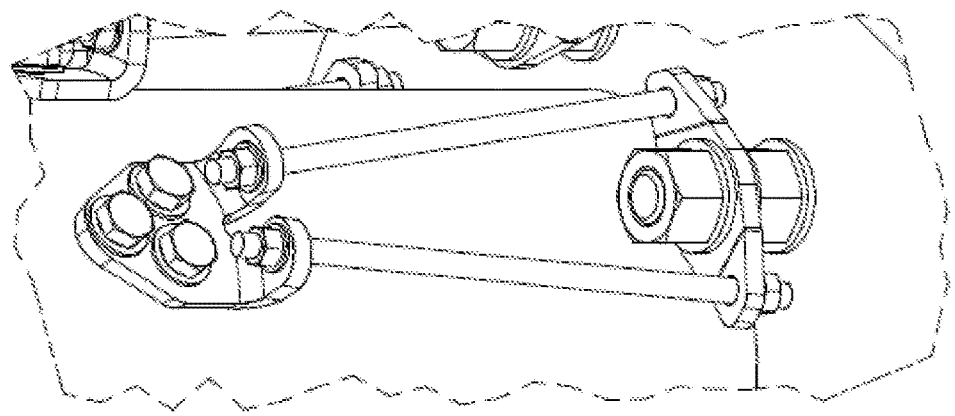

FIG. 9B is another perspective view of the base angle attachment assemblies coupled to the base and the pole illustrated in FIG. 9A.

Figure 10A:
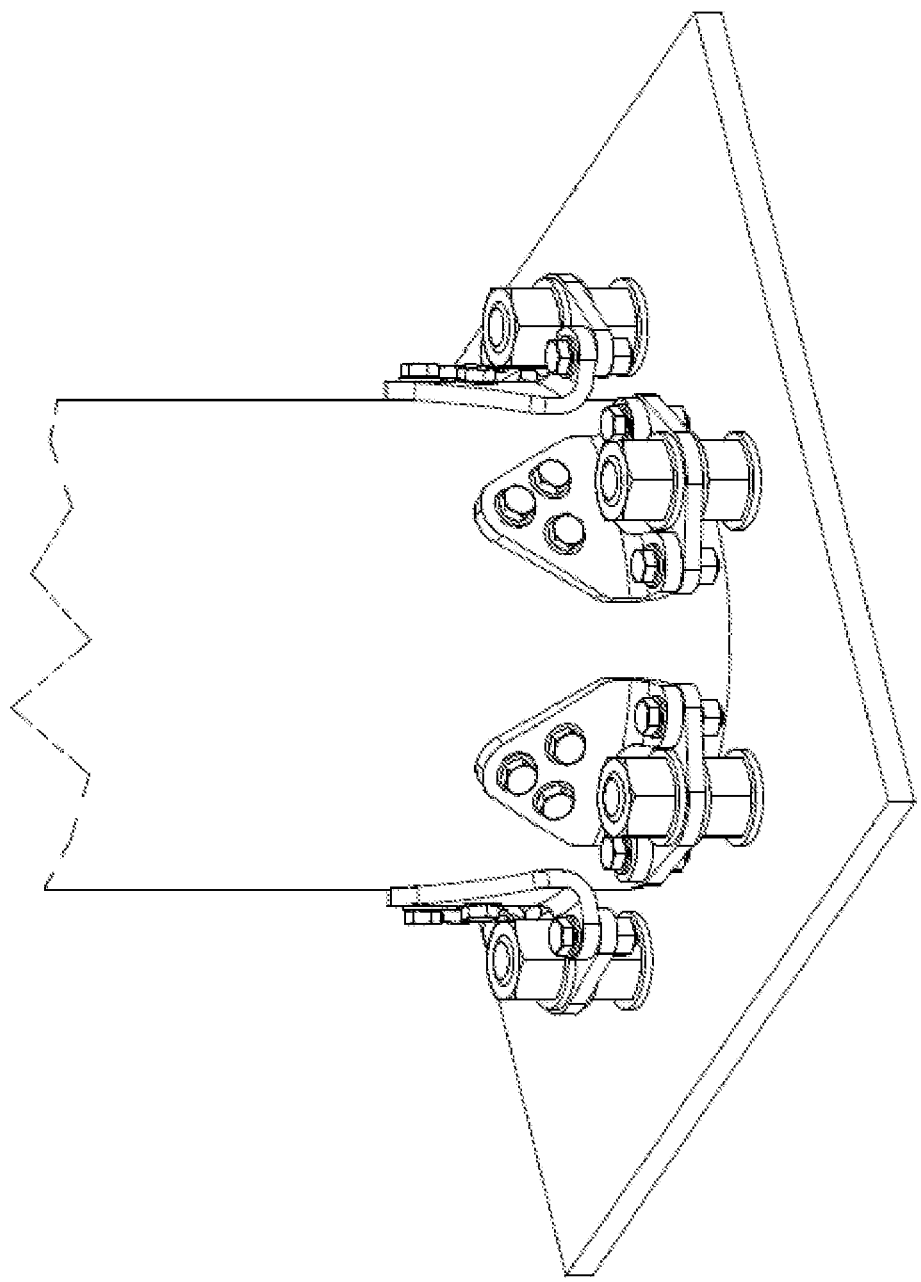

FIG. 10A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with three bolts extending through the lug connecting member of the connector and into an interior cavity of the pole, and the first connecting member is connected to the lug connecting member using fasteners.

Figure 10B:
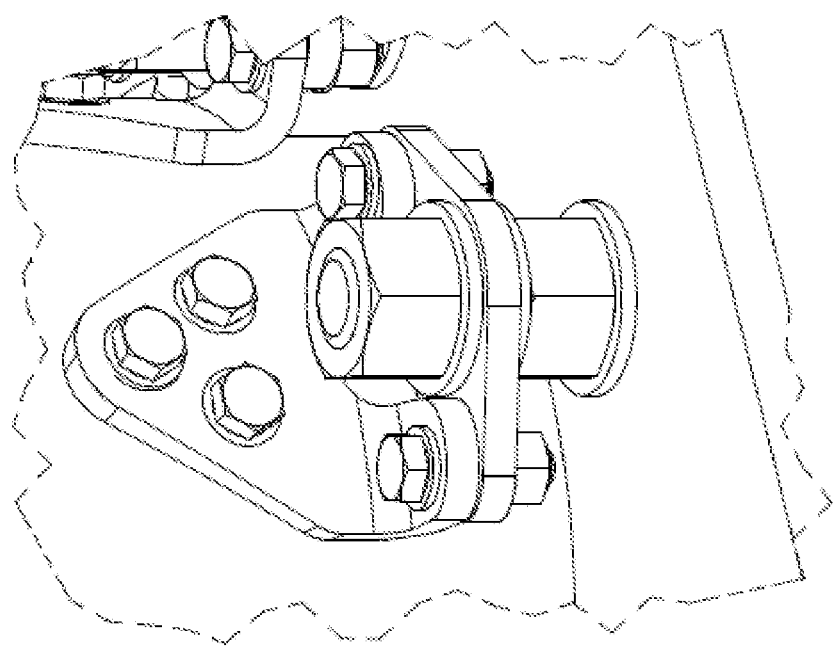

FIG. 10B is another perspective view of the base angle attachment assemblies coupled to the base and the pole illustrated in FIG. 10A.

Figure 11A:
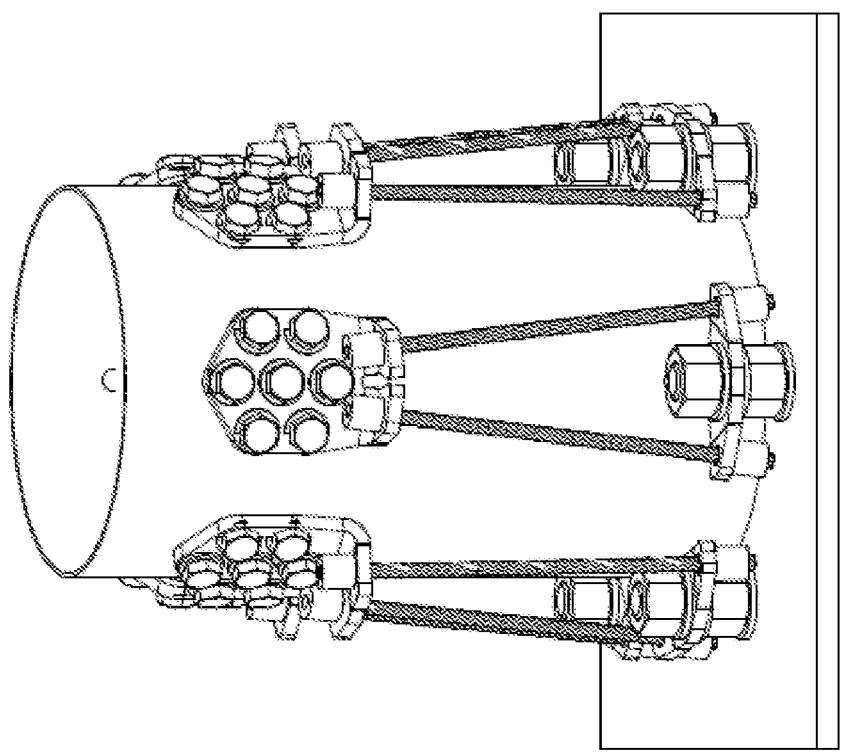

FIG. 11A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with seven bolts extending through the lug connecting member of the connector and into an interior cavity of the pole, and the first connecting member is connected to the lug connecting member using two pre-stressing strands.

Figure 11B:
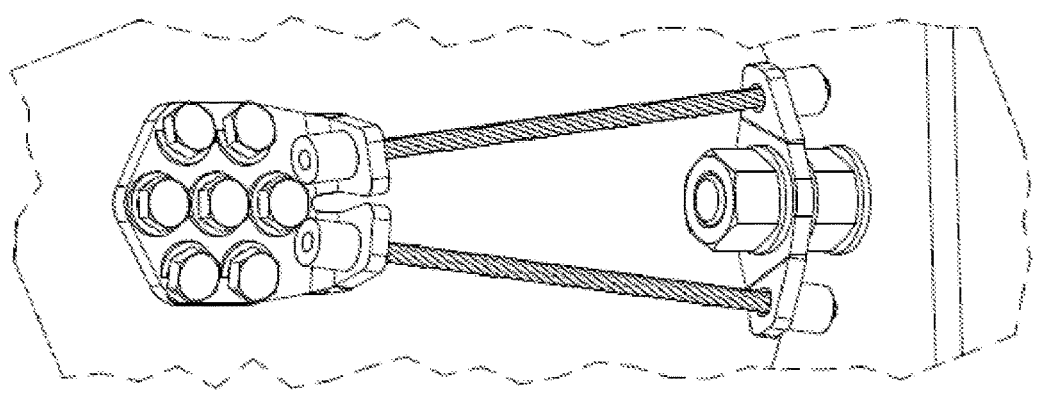

FIG. 11B is another perspective view of the base angle attachment assemblies coupled to the base and the pole illustrated in FIG. 11A.

Figure 12A:
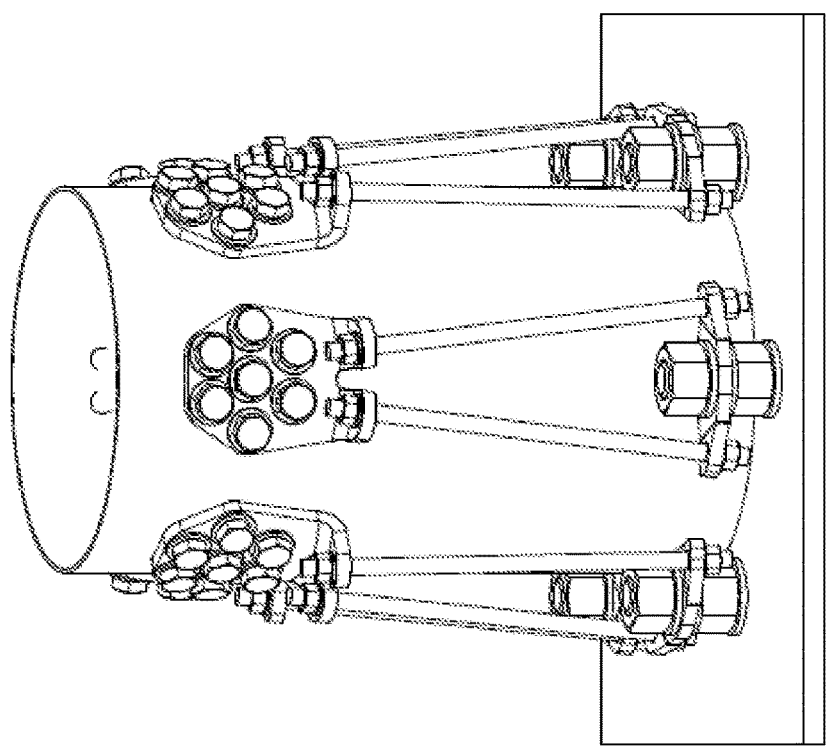

FIG. 12A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with seven bolts extending through the lug connecting member of the connector and into an interior cavity of the pole, and the first connecting member is connected to the lug connecting member using two threaded rods with nuts.

Figure 12B:
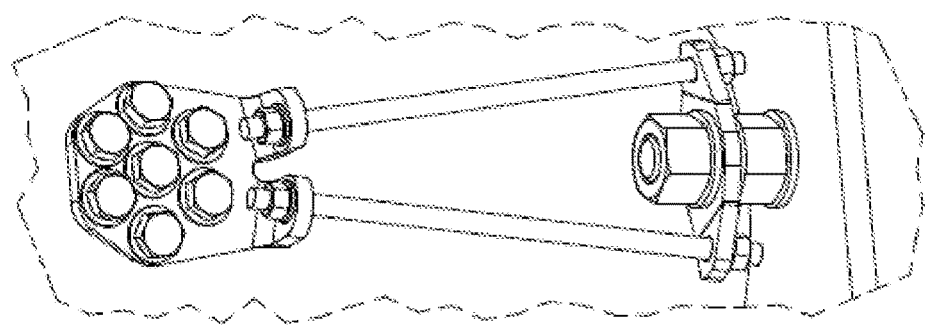

FIG. 12B is another perspective view of the base angle attachment assemblies coupled to the base and the pole illustrated in FIG. 12A.

Figure 13A:
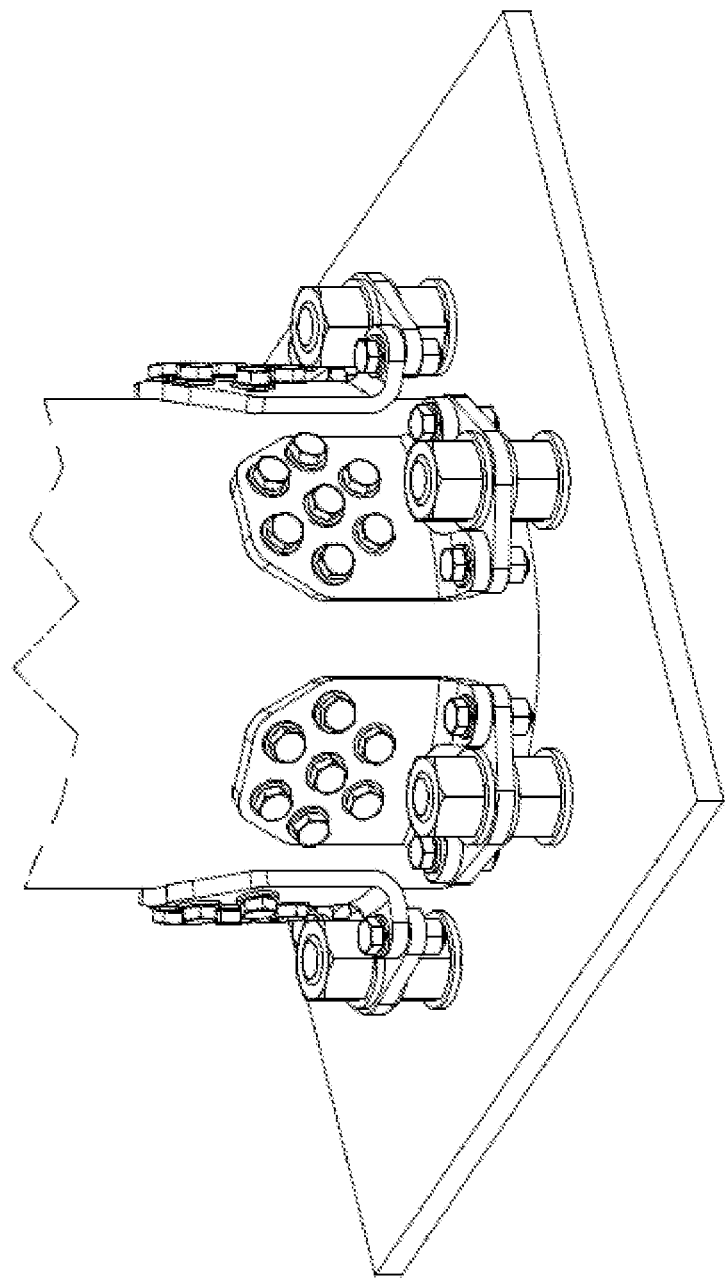

FIG. 13A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with seven bolts extending through the lug connecting member of the connector and into an interior cavity of the pole, the and first connecting member is connected to the lug connecting member using fasteners.

Figure 13B:
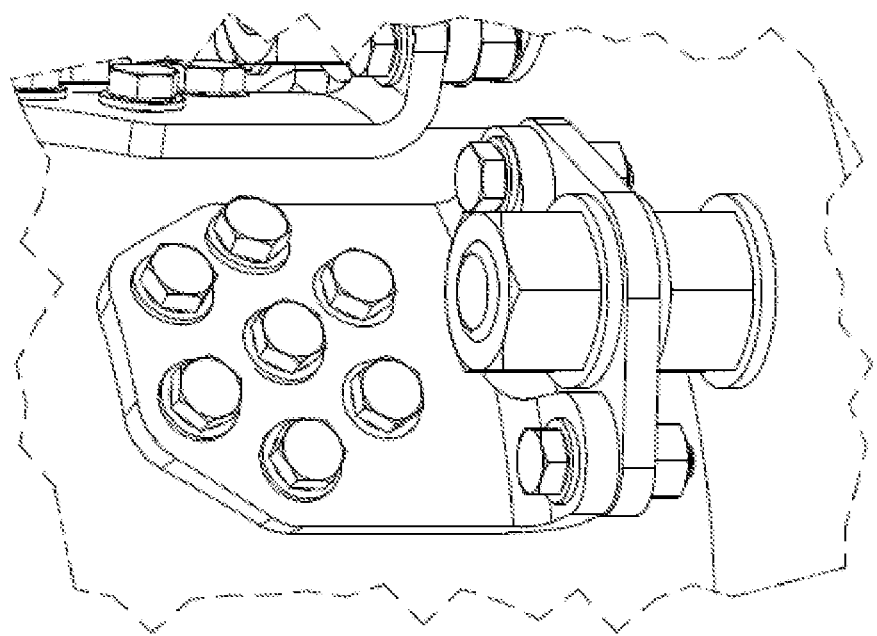

FIG. 13B is another perspective view of the base angle attachment assemblies coupled to the base and the pole illustrated in FIG. 13A.

Figure 14A:
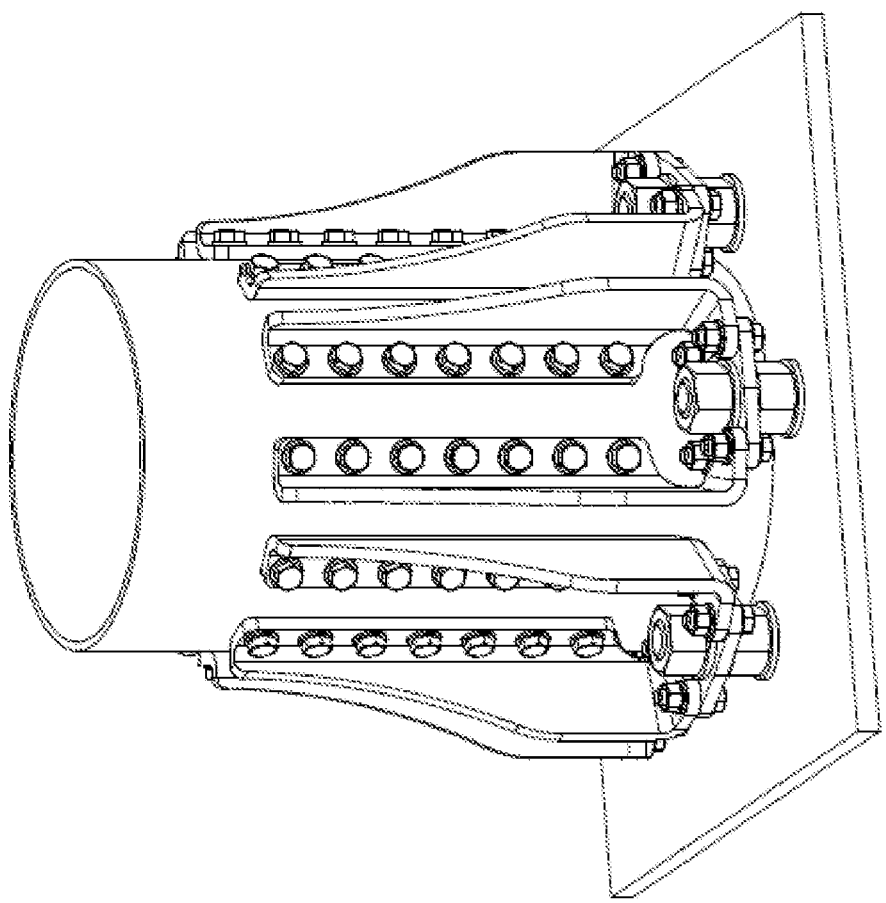

FIG. 14A is a perspective view illustrating base angle attachment assemblies including a connector for coupling to a base and a pole supported by the base, the pole having a round cross-section, where a first connecting member of the connector is coupled with an anchor bolt extending from the base, a first lug connecting member of the connector is coupled with seven bolts extending through the lug connecting member of the connector and into an interior cavity of the pole, a second lug connecting member of the connector is coupled with seven bolts extending through the lug connecting member of the connector and into an interior cavity of the pole, and the first connecting member is connected to the first and second lug connecting members using fasteners.

Figure 14B:
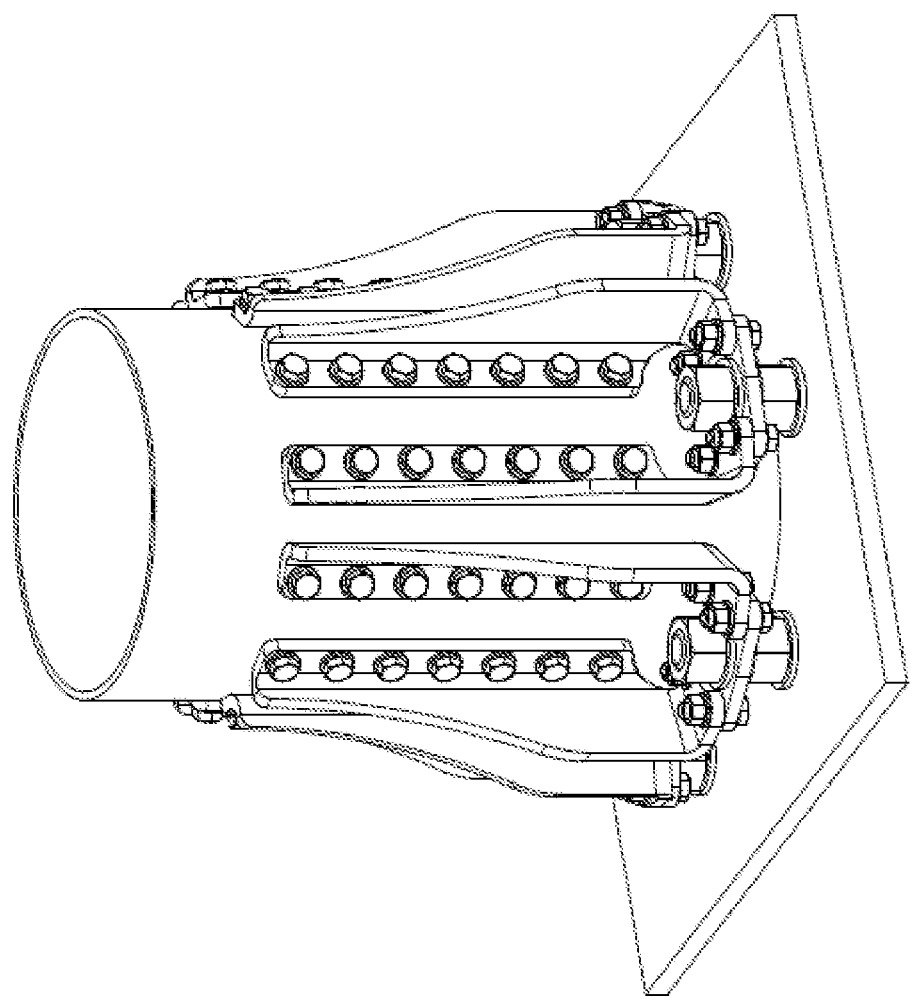

FIG. 14B is another perspective view of the base angle attachment assemblies coupled to the base and the pole illustrated in FIG. 14A.

Figure 15A:
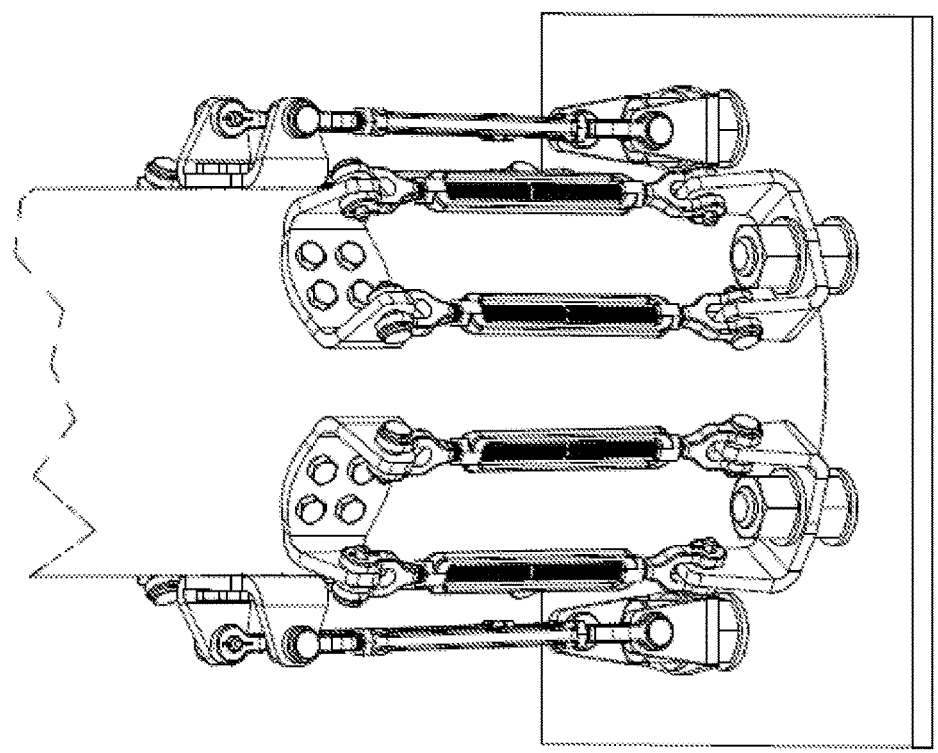

FIG. 15A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with three bolts extending through the lug connecting member of the connector and into an interior cavity of the pole, and the first connecting member is connected to the lug connecting member using two turnbuckle assemblies.

Figure 15B:
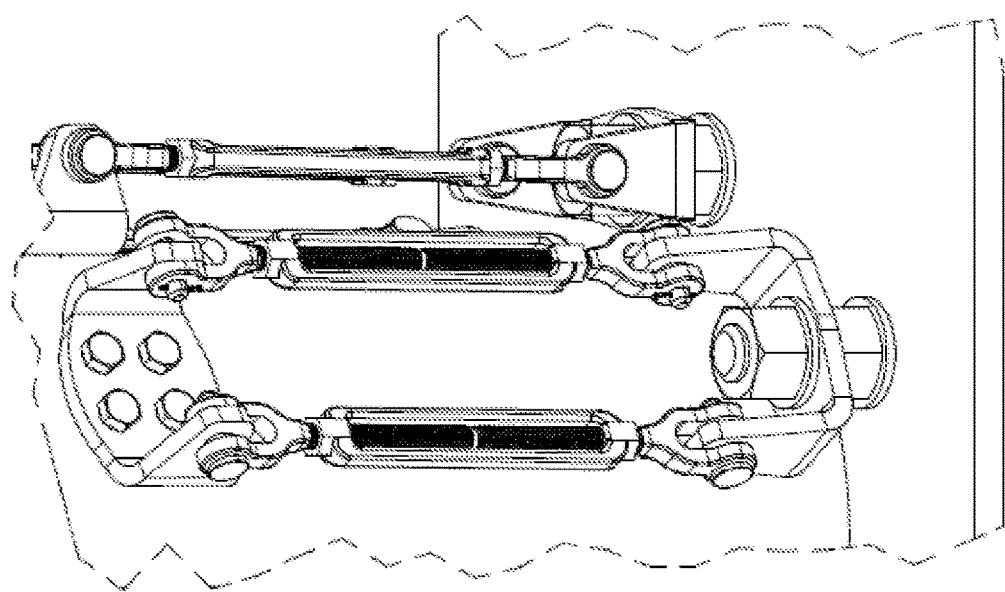

FIG. 15B is another perspective view of the base angle attachment assemblies coupled to the base and the pole illustrated in FIG. 15A.

Figure 16:
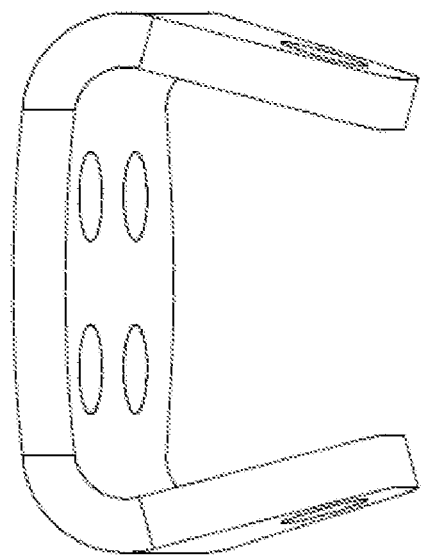

FIG. 16 is a perspective view illustrating a lug connecting member for connecting to a first connecting member of a connector in accordance with example implementations of the present disclosure.

Figure 17A:
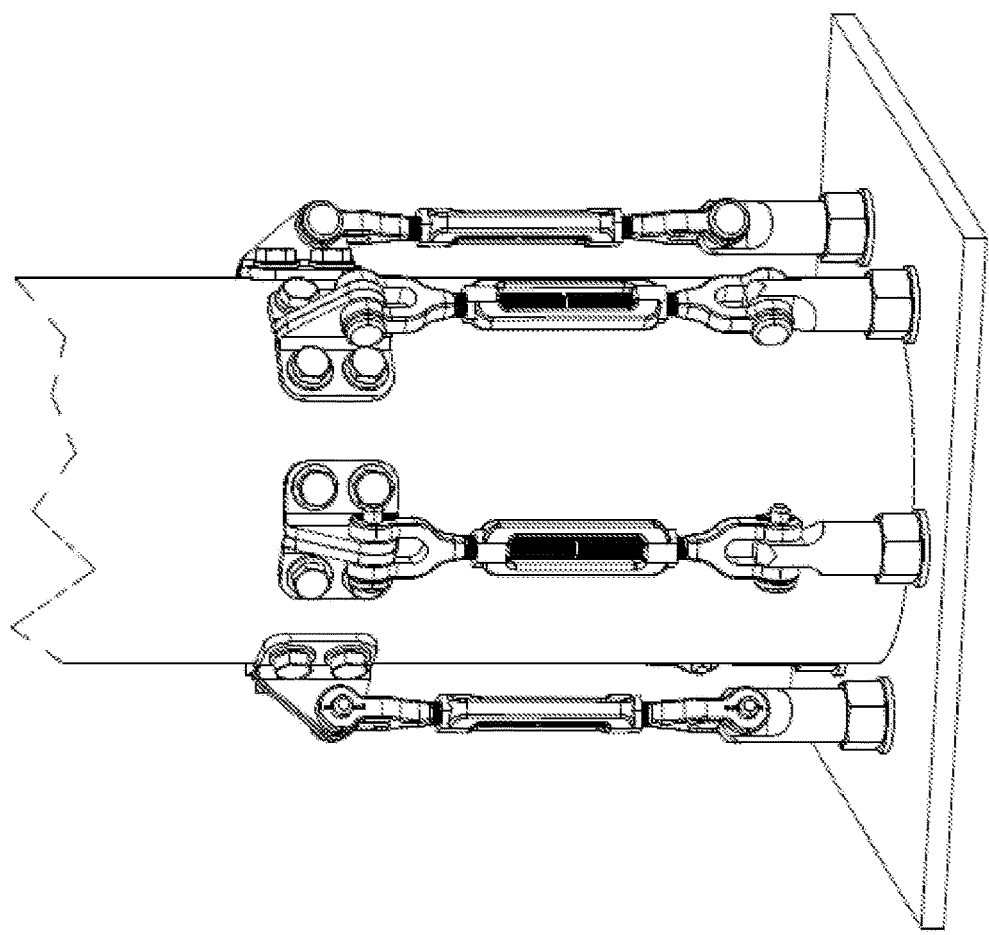

FIG. 17A is a perspective view illustrating base angle attachment assemblies including a connector for coupling to a base and a pole supported by the base, the pole having a round cross-section, where a first connecting member of the connector is coupled with an anchor bolt extending from the base, two lug connecting members of the connector are coupled with two bolts extending through each lug connecting member of the connector and into an interior cavity of the pole, and the first connecting member is connected to the two lug connecting members using a turnbuckle assembly.

Figure 17B:
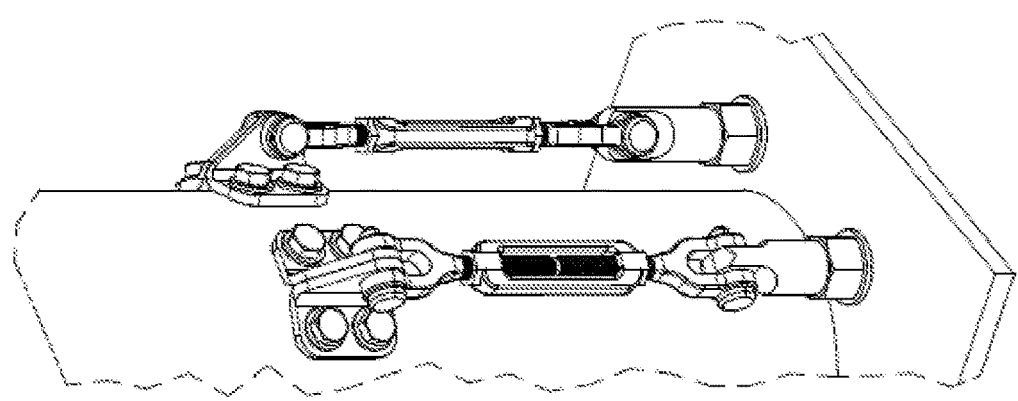

FIG. 17B is another perspective view of the base angle attachment assemblies coupled to the base and the pole illustrated in FIG. 17A.

Figure 18A:
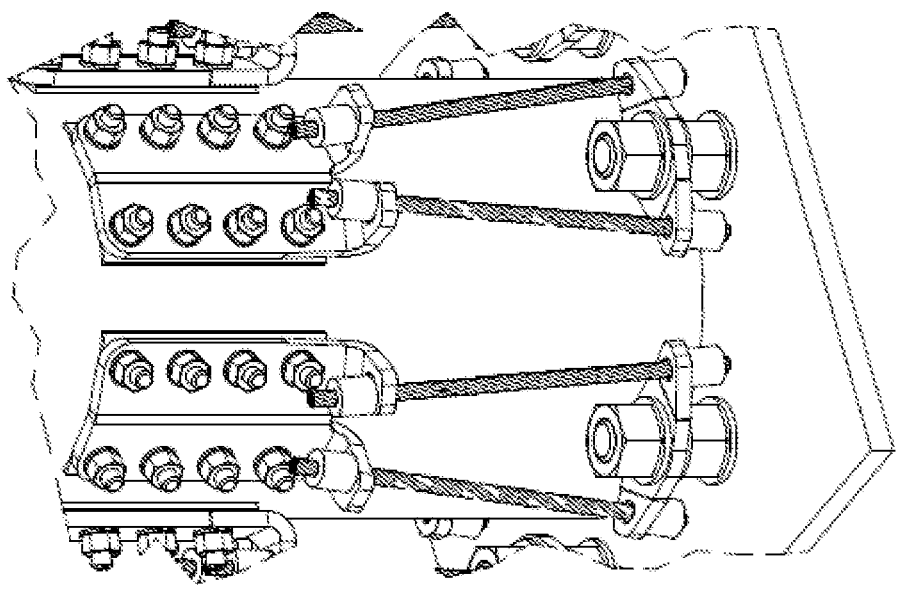

FIG. 18A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with eight bolts inserted from an interior cavity of the pole and extending through the lug connecting member of the connector, two containment assemblies are positioned in the interior cavity of the pole to align two sets of four bolts each with the lug connecting member, an external transitional shim having a concave faying surface is positioned between the lug connecting member and the outer surface of the pole, an internal transitional shim having a convex faying surface is positioned between a containment assembly and the inner surface of the pole, and the first connecting member is connected to the lug connecting member using two pre-stressing strands.

Figure 18B:
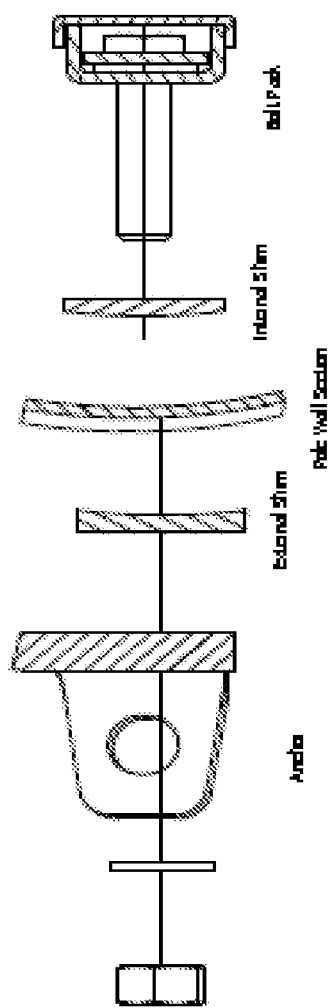

FIG. 18B is a partial exploded top plan view of a base angle attachment assembly illustrated in FIG. 18A.

Figure 18C:
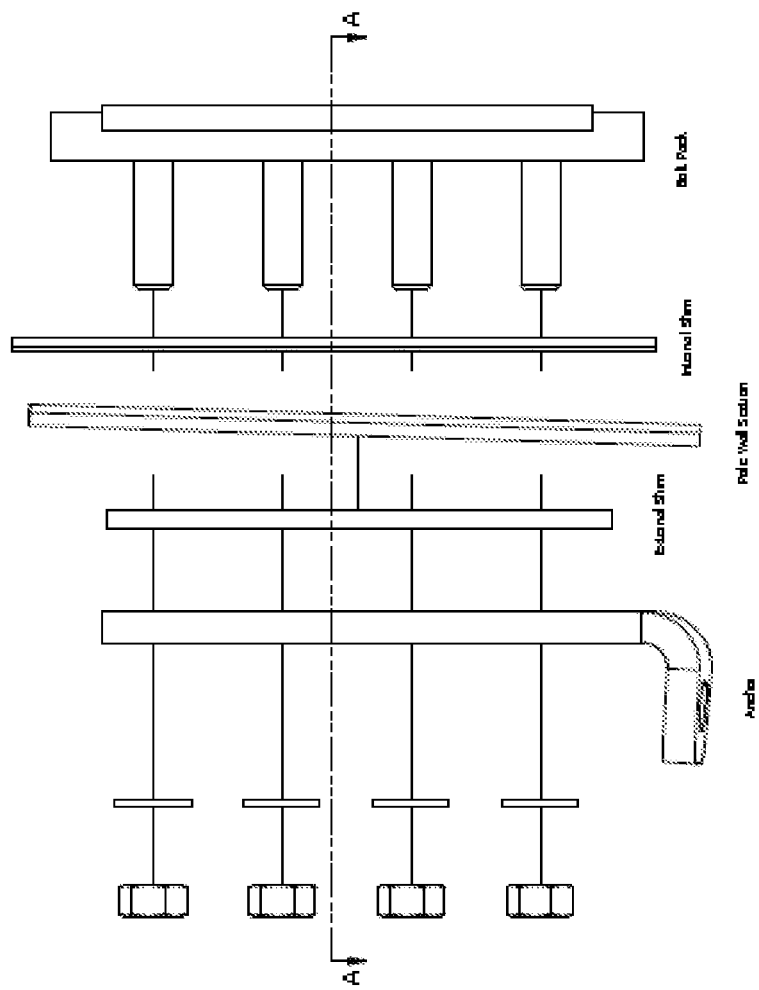

FIG. 18C is a partial exploded side elevation view of a base angle attachment assembly illustrated in FIG. 18A.

Figure 18D:
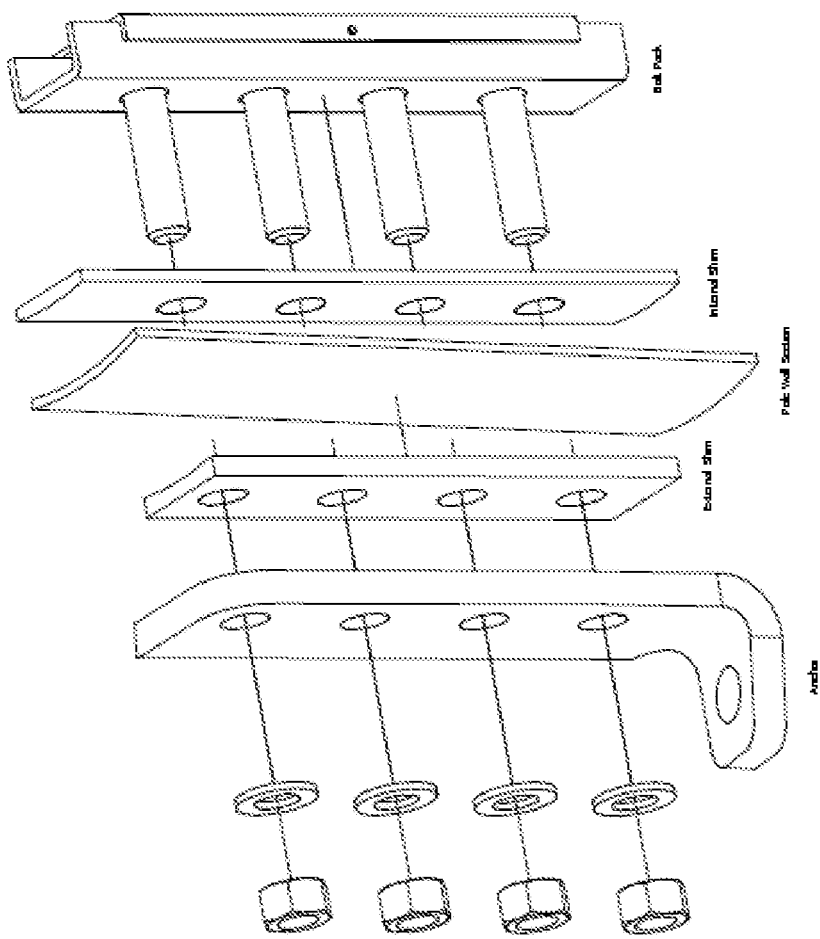

FIG. 18D is a partial perspective view of a base angle attachment assembly illustrated in FIG. 18A.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1A:
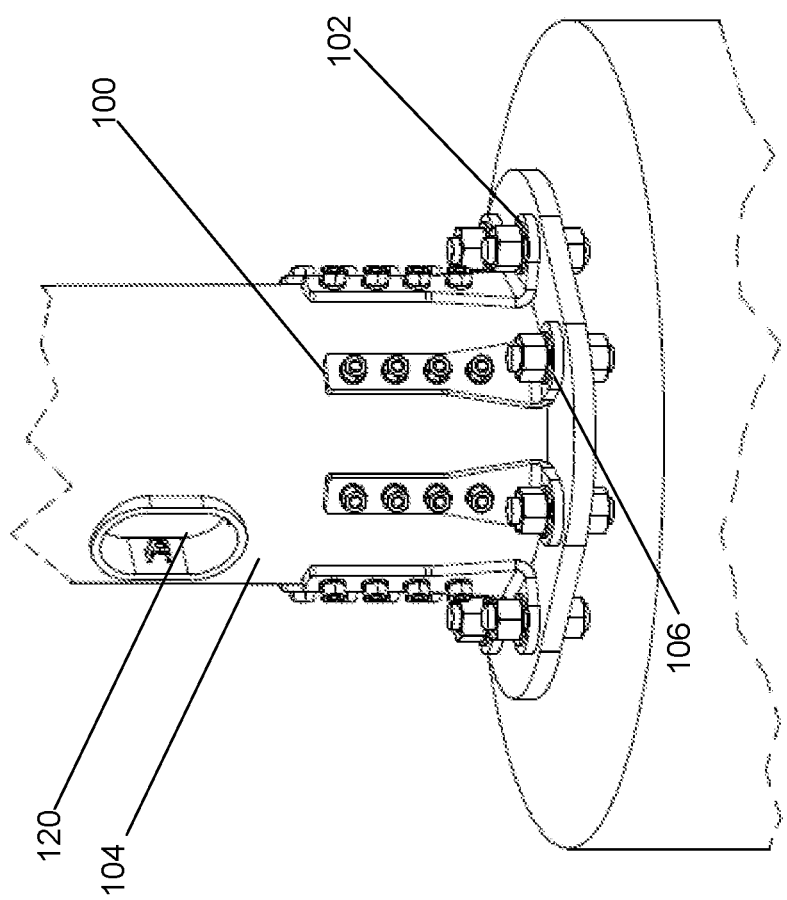
FIG. 1B is another perspective view of the base angle attachment assemblies coupled to the base and the pole illustrated in FIG. 1A.
FIG. 1C is a further perspective view of the base angle attachment assemblies coupled to the base and the pole illustrated in FIG. 1A.
FIG. 1D is another perspective view of the base angle attachment assemblies coupled to the base and the pole illustrated in FIG. 1A.

FIG. 1A is a perspective view illustrating base angle attachment assemblies including a lug connector for coupling to a base and a pole supported by the base, the pole having a polygonal cross-section, where a first connecting member of the lug connector is coupled with an anchor bolt extending from the base, a second connecting member of the lug connector is coupled with four bolts inserted from an interior cavity of the pole and extending through the second connecting member of the lug connector, and a containment assembly is positioned in the interior cavity of the pole to align the four bolts with the second connecting member of the lug connector in accordance with an example implementation of the present disclosure.

Some overhead equipment is supported using hollow steel utility poles anchored to the ground. Generally, a hollow pole can be mounted to a base using fasteners. For example, a foundation (e.g., a concrete foundation) is placed in the ground. Fasteners (e.g., anchor bolts) extend from the concrete foundation. Leveling nuts can be threaded onto the anchor bolts and used to level a base plate, which is supported by the leveling nuts. Washers can be positioned between the leveling nuts and the base plate. Top retaining nuts are used to secure the base plate to the concrete foundation. The hollow pole is fixedly connected to the base plate. For example, the hollow pole can be welded to the base plate. Over time, a weld joint between the hollow pole and the base plate can weaken. For example, cracks can develop in a weld joint at the toe of the weld fillet. Additionally, the shaft wall of a pole and/or welding material can rust and/or corrode. This can necessitate replacement of the pole, which can be a costly and/or logistically difficult operation.

Accordingly, techniques are described for reinforcing poles that are anchored to the ground. Poles that can be reinforced using the techniques of the present disclosure include, but are not necessarily limited to: utility poles for supporting overhead power lines and public utilities (e.g., cable, fiber optic cable, transformers, street lights, and so forth); telephone poles; power poles; telegraph poles; and so on. For instance, techniques of the present disclosure can be used with sports poles, sports lighting poles, high mast lighting structures, and so forth.

FIGS. 1 through 7 are perspective views illustrating base angle attachment assemblies including a lug connector 100 for coupling to a base 102 and a pole 104 supported by the base 102, the pole 104 having a polygonal cross-section, where a first connecting member 106 of the lug connector 100 is coupled with an anchor bolt 108 extending from the base 102, a second connecting member 110 of the lug connector 100 is coupled with four bolts 112 inserted from an interior cavity of the pole and extending through the second connecting member 110 of the lug connector 100, and a containment assembly 114 is positioned in the interior cavity of the pole to align the four bolts 112 with the second connecting member 110 of the lug connector 100 in accordance with an example implementation of the present disclosure.

In implementations, the poles 104 can range in size from about eight inches (8 in.) in diameter to about forty-two inches (42 in.) in diameter. For example, techniques of the present disclosure can be used with poles 104 ranging from about twelve inches (12 in.) to about thirty-six inches (36 in.) in diameter. Additionally, techniques of the present disclosure can be used with poles 104 ranging from about seventeen inches (17 in.) to about twenty-six inches (26 in.) in diameter. However, these ranges are provided by way of example only and are not meant to be restrictive of the present disclosure. Thus, techniques described herein can also be used with poles 104 having diameters less than about eight inches (8 in.) and/or more than about forty-two inches (42 in.).

In some implementations, the poles 104 can have generally polygonal cross-sections, and in other implementations, the poles 104 can have generally round cross-sections. However, these cross-sectional shapes are provided by way of example only and are not meant to be restrictive of the present disclosure. Thus, in other implementations, the poles 104 can have other variously shaped cross-sections, including but not necessarily limited to: square-shaped cross-sections, rectangle-shaped cross-sections, elliptical-shaped cross-sections, and so forth. In some instances, the poles 104 may have a generally constant cross-section from the ground toward the top of a pole 104. In other instances, the poles 104 may taper (e.g., narrowing from the ground toward the top of a pole).

A base angle attachment assembly includes a connector 100 for coupling to a base 102 and a pole 104 supported by the base 102. For example, a connector 100 may be configured as an angle bracket. The connector 100 has a first connecting member 106 and a second connecting member 110 extending generally perpendicularly with respect to the first connecting member 106. The first connecting member 106 of the connector defines an aperture for receiving a fastener (e.g., anchor bolt 108) configured to couple the connector 100 with the base 102. For example, the first connecting member 106 of the connector 100 can be configured to receive an anchor bolt 108 extending from a concrete foundation. To reinforce a pole 104, a top retaining nut 114 can be removed from an end of an anchor bolt 108, a connector 100 can be positioned on the anchor bolt 108 adjacent to the base plate 102, and the top retaining nut 114 can be threaded back onto the anchor bolt 108 to couple the connector 100 with the base 102. A washer 116 may be positioned between the connector 100 and the top retaining nut 114.

The second connecting member 110 of the connector 100 defines apertures for receiving fasteners (e.g., four bolts 112) configured to couple the connector 100 with the pole 104. In some instances, bolts 112 can be inserted from an interior cavity of the pole and extend through the second connecting member 110 of the connector 100 to reinforce the pole 104. Nuts 118 are threaded onto the bolts 112 to couple the connector 100 with the pole 104. Washers 116 may be positioned between the connector 100 and the nuts 118. In other instances, bolts 112 can extend through the second connecting member 110 of the connector 100 and into an interior cavity of the pole 104 to reinforce the pole 104. Nuts 118 are threaded onto the bolts 112 to couple the connector 100 with the pole 104. Washers 116 may be positioned between the pole 104 and the nuts 118. The bolts 112 can extend through holes in the pole 104, which can be drilled through the pole 104 using a connector 100 as a template for placing the holes. In implementations, the interior cavity of the pole can be accessed via an access point, such as a hand hole 120. The bolts 112 can range in size from about three-quarters of an inch (¾ in.) to about one and one-half inches (1½ in.). However, this range is provided by way of example only and is not meant to be restrictive of the present disclosure. Thus, techniques described herein can also be used with bolts 112 less than about three-quarters of an inch (¾ in.) and/or more than one and one-half inches (1½ in.) in size.

Figure 1B:
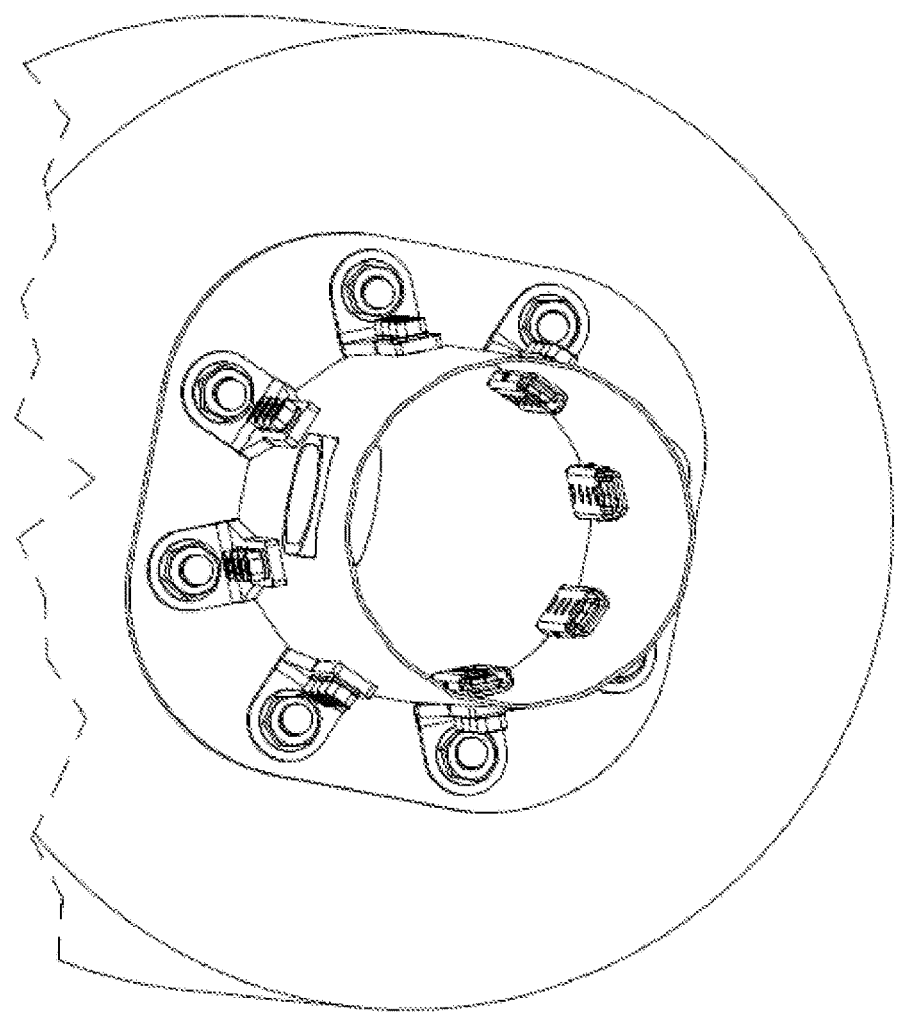

FIG. 1B is another perspective view of the base angle attachment assemblies coupled to the base and the pole illustrated in FIG. 1A.

Figure 1C:
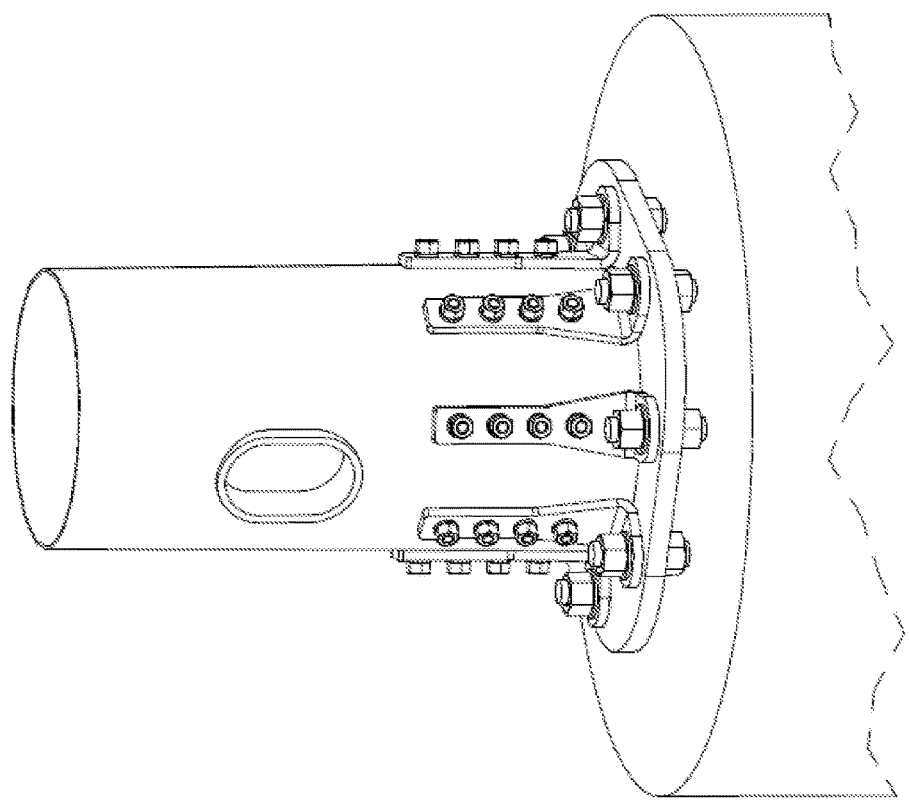

FIG. 1C is a further perspective view of the base angle attachment assemblies coupled to the base and the pole illustrated in FIG. 1A.

Figure 1D:
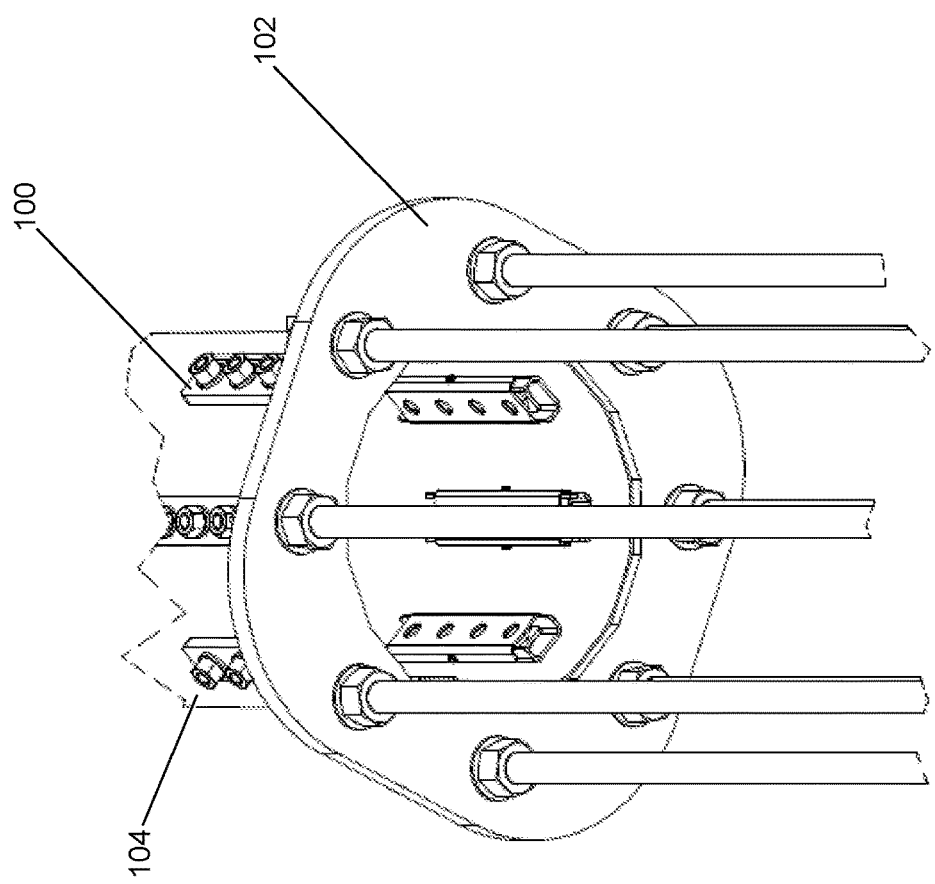

FIG. 1D is another perspective view of the base angle attachment assemblies coupled to the base and the pole illustrated in FIG. 1A.

FIG. 2A is a perspective view illustrating base angle attachment assemblies including a lug connector for coupling to a base and a pole supported by the base, the pole having a polygonal cross-section, where a first connecting member of the lug connector is coupled with an anchor bolt extending from the base, a second connecting member of the lug connector is coupled with four bolts inserted from an interior cavity of the pole and extending through the second connecting member of the lug connector, a containment assembly is positioned in the interior cavity of the pole to align the four bolts with the second connecting member of the lug connector, the anchor bolt is connected to the lug connector using a coupling nut and an additional bolt, and a standoff column is disposed between the lug connector and the base in accordance with an example implementation of the present disclosure.

In some instances, such as shown in FIGS. 2 and 3, there may not be sufficient projection of an anchor bolt 302 such that the anchor bolt 302 extends beyond a connector 200 a sufficient distance to receive a top retaining nut. In these instances as, a coupling nut 300 and an additional bolt 214 can be used in lieu of rethreading the top retaining nut onto the anchor bolt 302. For instance, a coupling nut 300 can be threaded onto an end of the anchor bolt 302, and an additional bolt 214 can be inserted through the connector 200 and threaded into the coupling nut 300 to couple the connector 200 to the base 218. In this type of configuration, a spacer 216, such as a standoff column, can be positioned between the base 218 and the connector 200. The standoff column 216 can be in the form of a pipe or a tube having a greater longitudinal dimension (e.g., height) than the coupling nut 300. In this manner, the standoff column 216 can be kept in compression between the base 218 and the connector 200 and can thus ensure that the coupling nut 300 is kept in tension and is not subject to cyclical stresses that would otherwise be seen by the coupling nut 300 (e.g., if the connector were to rest upon the coupling nut 300).

FIG. 2B is another perspective view of the base angle attachment assemblies coupled to the base and the pole illustrated in FIG. 2A.

FIG. 2C is a further perspective view of the base angle attachment assemblies coupled to the base and the pole illustrated in FIG. 2A.

FIG. 3A is a perspective view illustrating base angle attachment assemblies including a lug connector for coupling to a base and a pole supported by the base, the pole having a polygonal cross-section, where a first connecting member of the lug connector is coupled with an anchor bolt extending from the base, a second connecting member of the lug connector is coupled with four bolts extending through the second connecting member of the lug connector and into an interior cavity of the pole, a containment assembly is positioned in the interior cavity of the pole to align four nuts with the four bolts, the anchor bolt is connected to the lug connector using a coupling nut and an additional bolt, and a standoff column is disposed between the lug connector and the base in accordance with an example implementation of the present disclosure.

FIG. 3B is a partial perspective view of the base angle attachment assemblies coupled to the base and the pole illustrated in FIG. 3A where a standoff column is removed from one of the base angle attachment assemblies for illustration purposes.

FIG. 3C is another perspective view of the base angle attachment assemblies coupled to the base and the pole illustrated in FIG. 3A.

FIG. 3D is a partial perspective view of the base angle attachment assemblies coupled to the base and the pole illustrated in FIG. 3A where a standoff column, a coupling nut, and an additional bolt are removed from one of the base angle attachment assemblies for illustration purposes.

FIG. 3E is a partial perspective view of the base angle attachment assemblies coupled to the base and the pole illustrated in FIG. 3A where a standoff column and an additional bolt are removed from one of the base angle attachment assemblies for illustration purposes.

FIG. 3F is a partial perspective view of the base angle attachment assemblies coupled to the base and the pole illustrated in FIG. 3A, where a standoff column and a coupling nut are removed from one of the base angle attachment assemblies for illustration purposes.

FIG. 3G is another perspective view of the base angle attachment assemblies coupled to the base and the pole illustrated in FIG. 3A.

FIG. 3H is a plan view of the base angle attachment assemblies coupled to the base and the pole illustrated in FIG. 3A.

FIG. 4A is a perspective view illustrating a containment assembly for retaining four bolts in accordance with example implementations of the present disclosure.

A containment assembly is configured for insertion into an interior cavity of the pole (e.g., through the hand hole) for receiving and/or aligning the fasteners (e.g., bolts or nuts) with the apertures defined in the second connecting member of the connector. In implementations, the containment assembly includes a wrench plate disposed between a splice plate (washer plate) and a cover plate. The wrench plate can include apertures sized and shaped for receiving and engaging the heads of the bolts and/or the nuts. For example, the wrench plate can include laser cut hexagonally-shaped holes configured to receive both bolt heads and nuts. In this manner, the containment assembly can be used for both a nut pack and a bolt pack. In a bolt pack implementation, washers can be included between the bolt heads and the splice plate. One or more fasteners, such as screws, can be used to couple the splice plate and the cover plate. The wrench plate can define a path for allowing the wrench plate to move with respect to the interior of the containment assembly formed between the splice plate and the cover plate. For example, the wrench plate can define generally semicircular notches positioned proximate to the screws coupling the splice plate and the cover plate.

The wrench plate can include one or more standoff screws for adjusting the position of the wrench plate with respect to the interior of the containment assembly formed between the splice plate and the cover plate. A standoff screw can be used to adjust the position of the wrench plate so that it engages the fasteners, such as the bolts. For example, one or more standoff screws can be used to at least generally center the wrench plate about the bolt heads. Thus, in a bolt pack implementation where washers are included between the bolt heads and the splice plate, the distance furnished by a standoff screw can be equal to or greater than the thickness of a washer. In some instances, a standoff screw can be generally centered relative to the wrench plate. Further, standoff screws can be included at other positions with respect to the wrench plate. For example, a standoff screw can be positioned proximate to an end of the wrench plate. In other instances, the thickness of the wrench plate can be adjusted and/or fillers, such as shims and so forth, can be used to position the wrench plate. A containment assembly may also be configured as a splice connection assembly as described in U.S. Pat. No. 6,957,518, issued Oct. 25, 2005, and titled TWO-PLATE SPLICE CONNECTION ASSEMBLY," which is herein incorporated by reference in its entirety.

FIG. 4B is a plan view of the containment assembly illustrated in FIG. 4A.

FIG. 4C is a perspective view of the containment assembly illustrated in FIG. 4A, where a cover plate is removed from the containment assembly for illustration purposes.

FIG. 4D is a perspective view of the containment assembly illustrated in FIG. 4A, where a splice plate is removed from the containment assembly for illustration purposes.

FIG. 4E is a perspective view of the containment assembly illustrated in FIG. 4A, where the cover plate and the splice plate are removed from the containment assembly for illustration purposes.

FIG. 4F is another perspective view of the containment assembly illustrated in FIG. 4A.

FIG. 5A is a perspective view illustrating a containment assembly for retaining four nuts in accordance with example implementations of the present disclosure.

FIG. 5B is a perspective view of the containment assembly illustrated in FIG. 5A, where a cover plate is removed from the containment assembly for illustration purposes.

FIG. 5C is a perspective view of the containment assembly illustrated in FIG. 5A, where the cover plate and a splice plate are removed from the containment assembly for illustration purposes.

FIG. 5D is a plan view of the containment assembly illustrated in FIG. 5A.

FIG. 6 is a perspective view illustrating base angle attachment assemblies including a shoe connector for coupling to a base and a pole supported by the base, the pole having a round cross-section, where a first connecting member of the shoe connector is coupled with an anchor bolt extending from the base, and a second connecting member of the shoe connector is coupled with four bolts extending through the second connecting member of the shoe connector and into an interior cavity of the pole.

In some implementations, a connector 100, including the first connecting member 106 and the second connecting member 110, is of unitary construction. For example, a connector 100 can be formed as an angle bracket (e.g., a lug connector) having a first connecting member 106 configured as a first leg of the angle bracket and a second connecting member 110 configured as a second leg of the angle bracket, where the second leg of the angle bracket extends generally perpendicularly from the first leg of the angle bracket (e.g., as shown in FIGS. 1 through 3). In other implementations, a connector 100 can be formed as a shoe connector 700 having a first connecting member 702 and a second connecting member 704 joined together (e.g., using braces 706 welded to the first and second connecting members as shown in FIG. 7).

FIG. 7 is another perspective view of the base angle attachment assemblies coupled to the base and the pole illustrated in FIG. 6.

FIG. 8A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with three bolts extending through the lug connecting member of the connector and into an interior cavity of the pole, and the first connecting member is connected to the lug connecting member using two pre-stressing strands.

In still further implementations, a connector is formed using multiple parts that can be connected together to form the connector. For instance, a connector can comprise a second connecting member 800 formed as a lug connecting member and configured to connect to a first connecting member 802 using one or more pre-stressing members 804 (e.g., using pre-stressing strands as shown in FIGS. 8, 11, and 18; using threaded rods with nuts as shown in FIGS. 9 and 12; and/or using turnbuckles assemblies as shown in FIGS. 15 and 17). In other implementations, a connector can comprise second connecting member 800 formed as a lug connecting member (e.g., an angle bracket as previously described) and configured to connect to a first connecting member using fasteners (e.g., using bolts and nuts as shown in FIGS. 10 and 13). A lug connecting member can be an L-shaped connecting member (e.g., as shown in FIGS. 8 through 13, 17, and 18), a U-shaped connecting member (e.g., as shown in FIGS. 15 and 16), a T-shaped connecting member, and so forth. However, these shapes are provided by way of example only and are not meant to be restrictive of the present disclosure. Thus, in other implementations, lug connecting members can have other various shapes.

Additionally, more than one second connecting member can be used to connect to the first connecting member to form a connector. For example, a connector can comprise two connecting members formed as lug connecting members (e.g., angle brackets as previously described) and configured to connect to a first connecting member using fasteners (e.g., using bolts and nuts as shown in FIG. 14).

FIG. 8B is another perspective view of the base angle attachment assemblies coupled to the base and the pole illustrated in FIG. 8A.

FIG. 9A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with three bolts extending through the lug connecting member of the connector and into an interior cavity of the pole, and the first connecting member is connected to the lug connecting member using two threaded rods with nuts.

FIG. 9B is another perspective view of the base angle attachment assemblies coupled to the base and the pole illustrated in FIG. 9A.

FIG. 10A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with three bolts extending through the lug connecting member of the connector and into an interior cavity of the pole, and the first connecting member is connected to the lug connecting member using fasteners.

FIG. 10B is another perspective view of the base angle attachment assemblies coupled to the base and the pole illustrated in FIG. 10A.

FIG. 11A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with seven bolts extending through the lug connecting member of the connector and into an interior cavity of the pole, and the first connecting member is connected to the lug connecting member using two pre-stressing strands.

FIG. 11B is another perspective view of the base angle attachment assemblies coupled to the base and the pole illustrated in FIG. 11A.

FIG. 12A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with seven bolts extending through the lug connecting member of the connector and into an interior cavity of the pole, and the first connecting member is connected to the lug connecting member using two threaded rods with nuts.

FIG. 12B is another perspective view of the base angle attachment assemblies coupled to the base and the pole illustrated in FIG. 12A.

FIG. 13A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with seven bolts extending through the lug connecting member of the connector and into an interior cavity of the pole, the and first connecting member is connected to the lug connecting member using fasteners.

FIG. 13B is another perspective view of the base angle attachment assemblies coupled to the base and the pole illustrated in FIG. 13A.

FIG. 14A is a perspective view illustrating base angle attachment assemblies including a connector for coupling to a base and a pole supported by the base, the pole having a round cross-section, where a first connecting member of the connector is coupled with an anchor bolt extending from the base, a first lug connecting member of the connector is coupled with seven bolts extending through the lug connecting member of the connector and into an interior cavity of the pole, a second lug connecting member of the connector is coupled with seven bolts extending through the lug connecting member of the connector and into an interior cavity of the pole, and the first connecting member is connected to the first and second lug connecting members using fasteners.

FIG. 14B is another perspective view of the base angle attachment assemblies coupled to the base and the pole illustrated in FIG. 14A.

FIG. 15A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with three bolts extending through the lug connecting member of the connector and into an interior cavity of the pole, and the first connecting member is connected to the lug connecting member using two turnbuckle assemblies.

FIG. 15B is another perspective view of the base angle attachment assemblies coupled to the base and the pole illustrated in FIG. 15A.

FIG. 16 is a perspective view illustrating a lug connecting member for connecting to a first connecting member of a connector in accordance with example implementations of the present disclosure.

FIG. 17A is a perspective view illustrating base angle attachment assemblies including a connector for coupling to a base and a pole supported by the base, the pole having a round cross-section, where a first connecting member of the connector is coupled with an anchor bolt extending from the base, two lug connecting members of the connector are coupled with two bolts extending through each lug connecting member of the connector and into an interior cavity of the pole, and the first connecting member is connected to the two lug connecting members using a turnbuckle assembly.

FIG. 17B is another perspective view of the base angle attachment assemblies coupled to the base and the pole illustrated in FIG. 17A.

FIG. 18A is a perspective view illustrating base angle attachment assemblies including a connector for coupling to a base and a pole supported by the base, the pole having a round cross-section, where a first connecting member of the connector is coupled with an anchor bolt extending from the base, a lug connecting member of the connector is coupled with eight bolts inserted from an interior cavity of the pole and extending through the lug connecting member of the connector, two containment assemblies are positioned in the interior cavity of the pole to align two sets of four bolts each with the lug connecting member, an external transitional shim having a concave faying surface is positioned between the lug connecting member and the outer surface of the pole, an internal transitional shim having a convex faying surface is positioned between a containment assembly and the inner surface of the pole, and the first connecting member is connected to the lug connecting member using two pre-stressing strands.

FIG. 18B is a partial exploded top plan view of a base angle attachment assembly illustrated in FIG. 18A.

FIG. 18C is a partial exploded side elevation view of a base angle attachment assembly illustrated in FIG. 18A.

FIG. 18D is a partial perspective view of a base angle attachment assembly illustrated in FIG. 18A.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or an should be read as meaning "at least one," one or more or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that maybe available or known now or at any time in the future. Hence, where this document refers to technologies that would be apparent or known to one of ordinary skill in the art, such technologies encompass those apparent or known to the skilled artisan now or at any time in the future.

A group of items linked with the conjunction and should not be read as requiring that each and every one of those items be present in the grouping, but rather should be read as "and/or" unless expressly stated otherwise. Similarly, a group of items linked with the conjunction or should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for providing support to a pole assembly wherein the pole assembly is comprised of a vertical pole member which is integrally connected to a flared circular metal plate, wherein the circular metal plate extends around a full perimeter of the vertical pole member and includes a plurality of apertures for allowing a plurality of anchor bolts to extend through the circular metal plate, further wherein the vertical pole member comprises an outer wall which has a perimeter which extends 360 degrees around a center point within the vertical pole member and which further comprises an interior wall surface and an exterior wall surface; the system comprising:
   a vertical opening, wherein the vertical opening is formed within the outer wall of the vertical pole member; wherein the vertical opening is comprised of an elongated slot opening in the wall of the vertical pole member which extends in a vertical direction;
   a plurality of base angle attachment assemblies, wherein at least a plurality of the base angle attachment assemblies comprises:
      a connector for coupling the circular metal plate to the vertical pole member, wherein the connector comprises:
         a first connecting element, wherein the first connecting element defines at least a first aperture for receiving an anchor bolt extending from the circular metal plate; and
         a second connecting element, wherein the second connecting element extends perpendicularly with respect to the first connecting member; further wherein the second connecting element defines a plurality of vertically spaced apertures; and
   a plurality of containment assemblies, wherein the plurality of containment assemblies are configured for insertion into an interior portion of the pole assembly and attachment onto the interior wall surface of the pole assembly; wherein the plurality of container assemblies are further configured to be inserted into the interior portion of the pole assembly through the vertical opening; wherein the plurality of containment assemblies further comprise:
      a wrench plate and a splice plate, wherein the wrench plate comprises a plurality of spaced holes within a substantially flat, rectangular surface; wherein the splice plate is comprised of a u-shaped metal surface forming a central channel; wherein the wrench plate is positioned within the central channel of the splice plate; and
      a plurality of lug connectors, wherein the lug connectors extend from the wrench plate through the outer wall of the pole assembly and through the plurality of vertical apertures of the plurality of second connecting elements.

* * * * *